US011856598B2

(12) United States Patent
Xu et al.

(10) Patent No.: US 11,856,598 B2
(45) Date of Patent: Dec. 26, 2023

(54) PREDICTION-BASED CONTROL INFORMATION FOR WIRELESS COMMUNICATIONS

(71) Applicant: QUALCOMM Incorporated, San Diego, CA (US)

(72) Inventors: Huilin Xu, Temecula, CA (US); Lianghai Ji, San Diego, CA (US); Liangping Ma, San Diego, CA (US); Qiang Wu, San Diego, CA (US); Mehmet Izzet Gurelli, San Diego, CA (US); Jun Ma, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/578,328

(22) Filed: Jan. 18, 2022

(65) Prior Publication Data

US 2023/0232440 A1   Jul. 20, 2023

(51) Int. Cl.
*H04W 72/542* (2023.01)
*H04W 72/23* (2023.01)
*H04B 17/391* (2015.01)

(52) U.S. Cl.
CPC ...... *H04W 72/542* (2023.01); *H04B 17/3913* (2015.01); *H04W 72/23* (2023.01)

(58) Field of Classification Search
CPC . H04W 72/542; H04W 72/23; H04B 17/3913
See application file for complete search history.

(56) References Cited

U.S. PATENT DOCUMENTS

2010/0087195 A1* 4/2010 Lu .................. H04W 36/30
2016/0100390 A1  4/2016 Kuo
(Continued)

OTHER PUBLICATIONS

Partial International Search Report—PCT/US2022/082168—ISA/EPO—dated Apr. 4, 2023.
(Continued)

*Primary Examiner* — Ronald B Abelson
(74) *Attorney, Agent, or Firm* — Holland & Hart LLP/QUALCOMM Incorporated

(57) ABSTRACT

Methods, systems, and devices for wireless communications are described. Some wireless devices may support a prediction capability for prediction-based control information. A first device may receive, from a second device, first control signaling that activates the predication capability of the first device to generate a set of one or more control parameters for communications. The second device may transmit second control signaling to the first device to indicate initial values of the control parameters and a channel condition model for the first device. The first device and the second device may generate a set of multiple values associated with the control parameters over a time period based on the initial values of the control parameters and the channel condition model. The first device and the second device may communicate during at least the time period according to the set of generated values associated with the control parameters.

40 Claims, 19 Drawing Sheets

(56) References Cited

U.S. PATENT DOCUMENTS

2018/0175926 A1    6/2018   Rudrapatna
2018/0367241 A1   12/2018  Hetrick et al.

OTHER PUBLICATIONS

Huawei et al., "Discussion on Non Continuous Coverage", 3GPP TSG-RAN2 Meeting #116bis-e, R2-2201453, 3rd Generation Partnership Project (3GPP), Mobile Competence Centre, 650, Route Des Lucioles, F-06921 Sophia-Antipolis Cedex, France, vol. RAN WG2, No. Online, Jan. 17, 2022-Jan. 25, 2022, 3 Pages, Jan. 11, 2022, XP052094552, sections 1 and 2.

International Search Report and Written Opinion—PCT/US2022/082168—ISA/EPO—dated Jun. 7, 2023.

Sony: "CG Enhancements in NTN", 3GPP TSG-RAN WG2 Meeting #116 electronic, R2-2110354, 3rd Generation Partnership Project (3GPP), Mobile Competence Centre, 650, Route Des Lucioles, F-06921, Sophia-Antipolis Cedex, France, vol. RAN WG2, No. Online, Nov. 1, 2021-Nov. 12, 2021, 1 Pages, Oct. 21, 2021, XP052066796.

\* cited by examiner

PREDICTION-BASED CONTROL INFORMATION FOR WIRELESS COMMUNICATIONS

INTRODUCTION

The following related generally to wireless communications, and more specifically to control information for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device is described. The method may include receiving first control signaling that activates a prediction capability of the first device to generate a set of one or more control parameters for communications and receiving second control signaling that indicates initial values of the set of one or more control parameters and a channel condition model for the first device. In some examples, the method may include generating a set of multiple values associated with the set of one or more control parameters over a time period. In some examples, the generated set of multiple values may be based on the initial values of the set of one or more control parameters and the channel condition model. In some examples, the method may include communicating with a second device for at least the time period according to the generated set of multiple values associated with the set of one or more control parameters.

An apparatus for wireless communication at a first device is described. The apparatus may include a processor and memory coupled with the processor. The processor may be configured to receive first control signaling that activates a prediction capability of the first device to generate a set of one or more control parameters for communications and receive second control signaling that indicates one or more initial values of the set of one or more control parameters and a channel condition model for the first device. In some examples, the processor may be configured to generate a set of multiple values associated with the set of one or more control parameters over a time period. In some examples, the generated set of multiple values may be based on the one or more initial values of the set of one or more control parameters and the channel condition model. In some examples, the processor may be configured to communicate with a second device during at least the time period according to the generated set of multiple values associated with the set of one or more control parameters.

Another apparatus for wireless communication at a first device is described. The apparatus may include means for receiving first control signaling that activates a prediction capability of the first device to generate a set of one or more control parameters for communications and means for receiving second control signaling that indicates one or more initial values of the set of one or more control parameters and a channel condition model for the first device. In some examples, the apparatus may include means for generating a set of multiple values associated with the set of one or more control parameters over a time period. In some examples, the generated set of multiple values based on the one or more initial values of the set of one or more control parameters and the channel condition model. In some examples, the apparatus may include means for communicating with a second device during at least the time period according to the generated set of multiple values associated with the set of one or more control parameters.

A non-transitory computer-readable medium storing code for wireless communication at a first device is described. The code may include instructions executable by a processor to receive first control signaling that activates a prediction capability of the first device to generate a set of one or more control parameters for communications and receive second control signaling that indicates one or more initial values of the set of one or more control parameters and a channel condition model for the first device. In some examples, the code may include instructions executable by the processor to generate a set of multiple values associated with the set of one or more control parameters over a time period. In some examples, the generated set of multiple values may be based on the one or more initial values of the set of one or more control parameters and the channel condition model. In some examples, the code may include instructions executable by the processor to communicate with a second device during at least the time period according to the generated set of multiple values associated with the set of one or more control parameters.

In some examples of the method, apparatuses, and non-transitory computer-readable medium described herein, receiving the first control signaling may include operations, features, means, or instructions for receiving, via the first control signaling, an indication of a set of multiple channel condition models including at least the channel condition model.

In some examples of the method, apparatuses, and non-transitory computer-readable medium described herein, receiving the second control signaling may include operations, features, means, or instructions for receiving, via the second control signaling, an indication of an index of the channel condition model from the set of multiple channel condition models.

In some examples of the method, apparatuses, and non-transitory computer-readable medium described herein, receiving the second control signaling may include operations, features, means, or instructions for receiving a first control message that indicates a subset of indices of a subset of channel condition models from the set of multiple channel condition models and receiving a second control message that indicates an index of the channel condition model for the first device from the subset of indices.

In some examples of the method, apparatuses, and non-transitory computer-readable medium described herein, the first control signaling may indicate a respective type or a respective set of parameters or both associated with each channel condition model of the set of multiple channel condition models. In some examples, the respective type may correspond to a normalized function indicative of a state of a channel between the first device and the second device and the respective set of parameters may include an amplitude or a duration or both of the normalized function.

In some examples of the method, apparatuses, and non-transitory computer-readable medium described herein, receiving the second control signaling may include operations, features, means, or instructions for receiving, via the second control signaling, a set of one or more model parameters associated with the channel condition model. The set of one or more model parameters may include a duration of the channel condition model, an amplitude of the channel condition model, or both.

Some examples of the method, apparatuses, and non-transitory computer-readable medium described herein may further include operations, features, means, or instructions for receiving a first control message that configures a set of multiple sets of model parameters associated with a set of multiple channel condition models and receiving, via the second control signaling, an indication of the set of one or more model parameters associated with the channel condition model from the set of multiple sets of model parameters configured by the first control message.

In some examples of the method, apparatuses, and non-transitory computer-readable medium described herein, generating the set of multiple values associated with the set of one or more control parameters may include operations, features, means, or instructions for generating the set of multiple values associated with the set of one or more control parameters over the time period in accordance with the channel condition model and based on a difference between a current time and a reference time associated with the channel condition model.

Some examples of the method, apparatuses, and non-transitory computer-readable medium described herein may further include operations, features, means, or instructions for receiving a control message that indicates the reference time for the first device.

In some examples of the method, apparatuses, and non-transitory computer-readable medium described herein, receiving the second control signaling may include operations, features, means, or instructions for receiving a downlink control information (DCI) message that indicates the one or more initial values of the set of one or more control parameters and the channel condition model for the first device. In some examples of the method, apparatuses, and non-transitory computer-readable medium described herein, receiving the second control signaling may include operations, features, means, or instructions for starting a timer in response to receiving the DCI message. In some examples, a duration of the timer may be based on the time period.

Some examples of the method, apparatuses, and non-transitory computer-readable medium described herein may further include operations, features, means, or instructions for receiving a control message that indicates the time period for the first device.

Some examples of the method, apparatuses, and non-transitory computer-readable medium described herein may further include operations, features, means, or instructions for receiving, during the time period, one or more DCI messages that indicate resource allocations for the communications between the first device and the second device. In some examples, each DCI message of the one or more DCI messages may include a resource indication field and may exclude a modulation and coding scheme (MCS) field, a transmit power control (TPC) field, a transmission configuration indicator (TCI) field, or any combination thereof based on the prediction capability of the first device.

In some examples of the method, apparatuses, and non-transitory computer-readable medium described herein, receiving the first control signaling may include operations, features, means, or instructions for receiving, via the first control signaling, an indication that the prediction capability of the first device may be activated for a first hybrid automatic repeat request (HARQ) process, activated for a set of multiple HARQ processes, activated per sounding reference signal (SRS) resource indicator (SRI), or any combination thereof.

Some examples of the method, apparatuses, and non-transitory computer-readable medium described herein may further include operations, features, means, or instructions for transmitting, to the second device, a capability message that indicates the prediction capability of the first device.

Some examples of the method, apparatuses, and non-transitory computer-readable medium described herein may further include operations, features, means, or instructions for transmitting, to the second device, one or more measurement report messages including an indication of channel state information (CSI) associated with a channel between the first device and the second device or position information associated with the first device or both. In some examples, the channel condition model may be based on the one or more measurement report messages.

In some examples of the method, apparatuses, and non-transitory computer-readable medium described herein, the set of one or more control parameters includes MCS parameters, beam parameters, uplink power control parameters, or any combination thereof.

In some examples of the method, apparatuses, and non-transitory computer-readable medium described herein, the first control signaling includes radio resource control (RRC) signaling and the second control signaling includes second RRC signaling, a medium access control-control element (MAC-CE), DCI, a downlink control channel message, or any combination thereof.

A method for wireless communication at a second device is described. The method may include transmitting, to a first device, first control signaling that activates a prediction capability of the first device and transmitting, to the first device, second control signaling that indicates one or more initial values of the set of one or more control parameters and a channel condition model for the first device. In some examples, the method may include generating a set of multiple values associated with the set of one or more control parameters over a time period. In some examples, the generated set of multiple values may be based on the one or more initial values of the set of one or more control parameters and the channel condition model. In some examples, the method may include scheduling communications with the first device during at least the time period according to the generated set of multiple values associated with the set of one or more control parameters.

An apparatus for wireless communication at a second device is described. The apparatus may include a processor, memory coupled with the processor, and instructions stored in the memory. The instructions may be executable by the processor to cause the apparatus to transmit, to a first device, first control signaling that activates a prediction capability of the first device and transmit, to the first device, second control signaling that indicates one or more initial values of the set of one or more control parameters and a channel condition model for the first device. In some examples, the instructions may be executable by the processor to generate a set of multiple values associated with the set of one or more control parameters over a time period. In some examples, the generated set of multiple values may be based on the one or more initial values of the set of one or more control parameters and the channel condition model. In some examples, the instructions may be executable by the processor to schedule communications with the first device during at least the time period accord to the generated set of multiple values associated with the set of one or more control parameters.

Another apparatus for wireless communication at a second device is described. The apparatus may include means for transmitting, to a first device, first control signaling that activates a prediction capability of the first device and means for transmitting, to the first device, second control signaling that indicates one or more initial values of the set of one or more control parameters and a channel condition model for the first device. In some examples, the apparatus may include means for generating a set of multiple values associated with the set of one or more control parameters over a time period. In some examples, the generated set of multiple values may be based on the one or more initial values of the set of one or more control parameters and the channel condition model. In some examples, the apparatus may include means for scheduling communications with the first device during at least the time period according to the generated set of multiple values associated with the set of one or more control parameters.

A non-transitory computer-readable medium storing code for wireless communication at a second device is described. The code may include instructions executable by a processor to transmit, to a first device, first control signaling that activates a prediction capability of the first device and to transmit, to the first device, second control signaling that indicates one or more initial values of the set of one or more control parameters and a channel condition model for the first device. In some examples, the code may include instructions executable by the processor to generate a set of multiple values associated with the set of one or more control parameters over a time period. In some examples, the generated set of multiple values may be based on the one or more initial values of the set of one or more control parameters and the channel condition model. In some examples, the code may include instructions executable by the processor to schedule communications with the first device during at least the time period accord to the generated set of multiple values associated with the set of one or more control parameters.

Some examples of the method, apparatuses, and non-transitory computer-readable medium described herein may further include operations, features, means, or instructions for transmitting, via the first control signaling, an indication of a set of multiple channel condition models including at least the channel condition model. Some examples of the method, apparatuses, and non-transitory computer-readable medium described herein may further include operations, features, means, or instructions for transmitting, via the second control signaling, an indication of an index of the channel condition model from the set of multiple channel condition models.

Some examples of the method, apparatuses, and non-transitory computer-readable medium described herein may further include operations, features, means, or instructions for transmitting the indication of the set of multiple channel condition models to the first device, to a group of one or more devices including the first device, to a set of multiple devices within a same cell, or any combination thereof.

In some examples of the method, apparatuses, and non-transitory computer-readable medium described herein, transmitting the second control signaling may include operations, features, means, or instructions for transmitting, via the second control signaling, a set of one or more model parameters associated with the channel condition model, the set of one or more model parameters including a duration of the channel condition model or an amplitude of the channel condition model or both.

Some examples of the method, apparatuses, and non-transitory computer-readable medium described herein may further include operations, features, means, or instructions for transmitting, to the first device, a first control message that configures a set of multiple sets of model parameters associated with a set of multiple channel condition models and transmitting, via the second control signaling, an indication of the set of one or more model parameters associated with the channel condition model from the set of multiple sets of model parameters configured by the first control message.

Some examples of the method, apparatuses, and non-transitory computer-readable medium described herein may further include operations, features, means, or instructions for generating the set of multiple values associated with the set of one or more control parameters over the time period in accordance with the channel condition model and based on a difference between a current time and a reference time associated with the channel condition model.

Some examples of the method, apparatuses, and non-transitory computer-readable medium described herein may further include operations, features, means, or instructions for transmitting, to the first device, a control message that indicates the reference time for the first device.

In some examples of the method, apparatuses, and non-transitory computer-readable medium described herein, transmitting the second control signaling may include operations, features, means, or instructions for transmitting a DCI message that indicates the one or more initial values of the set of one or more control parameters and the channel condition model for the first device and starting a timer in response to receiving the DCI message. In some examples, a duration of the timer may be based on the time period.

Some examples of the method, apparatuses, and non-transitory computer-readable medium described herein may further include operations, features, means, or instructions for transmitting, to the first device and during the time period, one or more DCI messages that indicate resource allocations for the communications between the first device and the second device. In some examples, each DCI message of the one or more DCI messages may include a resource indication field and may exclude an MCS field, a TPC field, a TCI field, or any combination thereof based on the prediction capability of the first device.

In some examples of the method, apparatuses, and non-transitory computer-readable medium described herein, transmitting the first control signaling may include operations, features, means, or instructions for transmitting, via the first control signaling, an indication that the prediction capability of the first device may be activated for a first HARQ process, activated for a set of multiple HARQ processes, activated per SRI, or any combination thereof.

Some examples of the method, apparatuses, and non-transitory computer-readable medium described herein may further include operations, features, means, or instructions for receiving, from the first device, a capability message that indicates the prediction capability of the first device.

Some examples of the method, apparatuses, and non-transitory computer-readable medium described herein may further include operations, features, means, or instructions for receiving, from the first device, one or more measurement report messages including an indication of CSI associated with a channel between the first device and the second device, position information associated with the first device, or both. In some examples, the channel condition model may be based on the one or more measurement reports.

DETAILED DESCRIPTION

Figure 1:
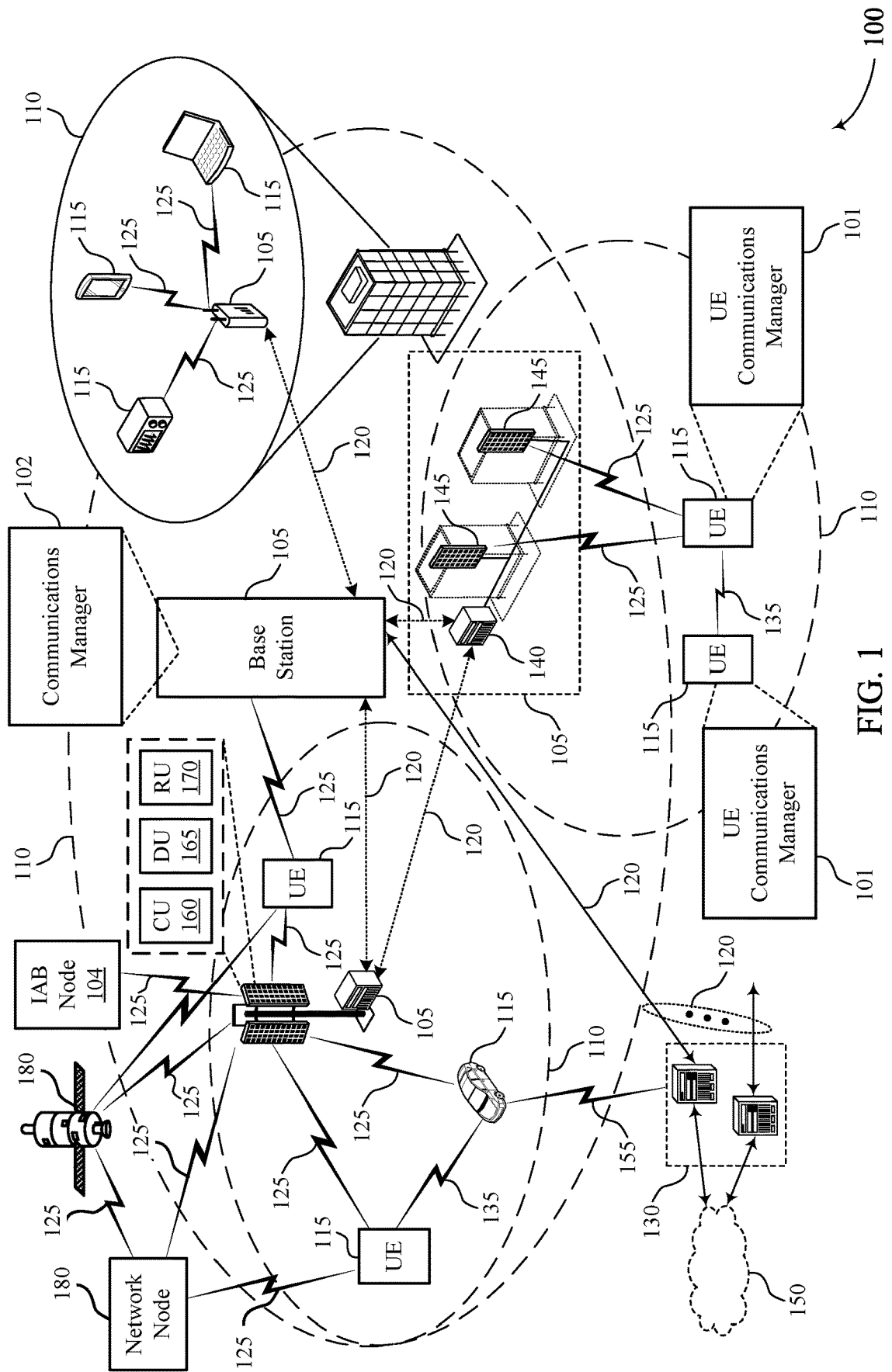
FIG. 1 illustrates an example of a wireless communications system that supports prediction-based control information for wireless communication in accordance with one or more aspects of the present disclosure.

In some systems, a network node may schedule communications by one or more UEs or other wireless devices within the network. The network node may transmit DCI to the UEs to dynamically or semi-persistently schedule the communications. The DCI may indicate time and frequency resources that are allocated for uplink or downlink communications by each UE and one or more control parameters for the UE to use for transmitting or receiving the communications. The control parameters may include an MCS, beam information, power control parameters, or any combination thereof. The beam information may include an indication of a TCI state associated with a beam for the UE to use to transmit or receive the communications. The power control parameters may include one or more parameters for adapting a transmit power for each communication. The control parameters may be based on conditions of a channel between the UE and the network node, such as a gain or strength of the channel. In some examples, the conditions of the channel may be determined based on one or more signal measurements, such as a reference signal received power (RSRP) measurement or a reference signal received quality (RSRQ) measurement, or both.

In some wireless communications systems, such as terrestrial networks, channel conditions may vary randomly over time due to terrestrial obstructions. Terrestrial networks may include wireless devices located on the Earth, or relatively close to the Earth (e.g., within the atmosphere), that communicate via terrestrial channels. To account for random variations in channel conditions, a network node may calculate or predict adjusted control parameters and transmit DCI relatively frequently to indicate the adjusted control parameters based on the varying channel conditions. The DCI may include one or more fields for conveying values of each respective control parameter. Frequent transmission of control information via the DCI may be associated with relatively large overhead.

In some other wireless communications systems, such as a non-terrestrial network (NTN), communication channels may be relatively predictable. NTN systems may correspond to systems that include one or more non-terrestrial network nodes that orbit the Earth (e.g., satellites). Channels between the NTN nodes and other terrestrial or non-terrestrial wireless devices within the system (e.g., other satellites, UEs, base stations) may be associated with line-of-sight (LoS) conditions. Additionally, the NTN nodes may orbit the Earth according to a predictable or periodic satellite orbit. As such, a distance between a wireless device and the network node may be relatively predictable and there may be an absence of terrestrial reflectors or other physical obstructions to the channel between the wireless device and the network node. In such cases, conditions of the satellite or non-terrestrial channel may be relatively predictable.

In order to reduce overhead associated with relatively frequent transmission of control information, techniques described herein provide for wireless devices to predict a set of one or more control parameters for communications with a network node based on a channel condition model and initial values of the control parameters. According to one or more examples, the channel condition model may be configured or calculated by a network node, and may be indicated to one or more wireless devices. The channel condition model may correspond to a function or a curve that indicates or models a variation in channel conditions over time. For example, the channel condition model may be a linear curve, a quadratic curve, a piecewise curve, or any combination thereof that may be defined according to one or more functions or model parameters, such as a duration or an amplitude, or both. In some examples, the channel condition models may model channels (e.g., satellite or NTN channels) associated with relatively predictable variations in channel conditions over time. Predicting the control parameters may include generating or calculating values of the control parameters over a time period by inputting the initial values of the control parameters into the function associated with the channel condition model, where the function outputs the predicted (e.g., estimated or approximated) values of the control parameters. The output of the channel condition model may include one or more values of each control parameter of the one or more control parameters (e.g., an MCS, beam information, power control parameters) over a time period. For example, each output value may correspond to a value of a respective one of the control parameters at a respective time or within a respective time period. A wireless device and a network node may each calculate values of control parameters over the time period based on an indicated or selected channel condition model and may apply the calculated value of each respective control parameter at the respective time during communications.

In one or more examples, a UE or other wireless device as described herein may be configured with a prediction capability, which may correspond to a capability of the UE to predict (e.g., generate, calculate, or estimate) values of a set of control parameters over time based on a channel condition model. The UE may transmit a capability message to a network node to indicate the prediction capability of the UE. The network node may transmit first control signaling (e.g., RRC signaling) to the UE to activate or enable the prediction capability of the UE. The network node may additionally or alternatively transmit, via the first control signaling, an indication of one or more configured channel condition models for the UE. The channel condition models may be configured per cell, per UE, or per group of UEs based on channel condition and UE location information. Each channel condition model may, in some examples, be defined according to a respective set of normalized model parameters (e.g., amplitude and duration).

The network node may, in some examples, transmit second control signaling to the UE to indicate a channel condition model from the set of multiple configured channel condition models and a set of initial values of the control parameters. For example, the second control signaling may indicate an index of the channel condition model from the set of multiple configured channel condition models. The channel condition model and the set of initial values may be indicated via a same or different control message within the second control signaling. In some examples, a DCI message within the second control signaling may indicate the set of initial values. One or more fields within the DCI message may convey the initial values of each of the control parameters.

The network node may transmit one or more other control messages or signals to the UE to indicate model parameters associated with the channel condition model, a reference time associated with the channel condition model, and the time period associated with the channel condition model. The model parameters may correspond to parameters (e.g., a duration, an amplitude) of the channel condition model that may be adjusted based on current conditions of the channel. For example, the UE may transmit a measurement report to the network node that indicates CSI, positioning information of the UE, or both, and the network node may determine adjusted model parameters based on the measurement report. The reference time may correspond to a reference point on the channel condition model curve for the UE. The UE may generate the set of values of the control parameters based on the channel condition model and a difference between a current time and the reference time. The time period, which may be referred to as a validity duration, may correspond to a time period over which the UE may utilize the channel condition model. If the time period expires, in some examples, the UE may refrain from predicting control values based on the channel condition model.

The network node and the UE may thereby generate predicted values of one or more control parameters for a time period based on the channel condition model and the initial values of the control parameters. The network node and the UE may communicate via the channel in accordance with the predicted values of the control parameters. The techniques described herein may be employed by wireless devices to reduce an amount of control information that may be exchanged between wireless devices to perform communications, which may reduce power consumption, reduce overhead, and improve spectral efficiency. By predicting the control values, the network node may refrain from transmitting values of the control parameters dynamically to the UE, which may reduce control signaling overhead. In some examples, the network node may transmit DCI messages to schedule communications with the UE, and one or more control information fields may be repurposed within the DCI or absent from the DCI based on the prediction capability of the UE. For example, the DCI messages may include a resource allocation field for scheduling the communications, but the DCI messages may not include, for example, an MCS field, a TCI field, a TPC field, one or more other fields, or any combination thereof. Such compact DCI messages may reduce overhead and improve a link budget, which may provide for improved communications with reduced capability devices or within systems that support Internet-Of-Things (IoT) communications.

Aspects of the disclosure are initially described in the context of wireless communications systems. Additional aspects are described with reference to channel condition models and process flows. Aspects of the disclosure are further illustrated by and described with reference to apparatus diagrams, system diagrams, and flowcharts that relate to prediction-based control information for wireless communication.

FIG. 1 illustrates an example of a wireless communications system 100 that supports prediction-based control information for wireless communication in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low-latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

In some examples, one or more components of the wireless communications system 100 may operate as or be referred to as a network node. As used herein, a network node may refer to any UE 115, base station 105, a relay node, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. The base stations 105 may include a communications manager 102 configured to transmit control signals to a UE 115 and receive communications from the UE 115. In some examples, the communications manager 102 may be configured to generate values associated with control parameters for wireless communications.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to perform one or more of the techniques for prediction-based control information for wireless communications as described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. The UEs 115 may each include a communications manager 101, which may receive one or more control signals and communicate with a base station 105 or a network node 180.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5GNR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may include one or more network nodes 180. The network nodes 180 may be nodes of a terrestrial network or an NTN. Each network node 180 may communicate with base stations 105 (also referred to as gateways in NTNs), UEs 115, and other high altitude or terrestrial communications devices. For NTN systems, the network node 180 may be any suitable type of communication satellite configured to relay communications between different end nodes in the wireless communication system 100. The network node 180 may be an example of a space satellite, a balloon, a dirigible, an airplane, a drone, an unmanned aerial vehicle, and the like. In some examples, the network node 180 may be in a geosynchronous or geostationary earth orbit, a low earth orbit or a medium earth orbit. A network node 180 may be a multi-beam satellite configured to provide service for multiple service beam coverage areas in a predefined geographical service area. The network node 180 may be any distance away from the surface of the Earth.

In some cases, a cell may be provided or established by a network node 180 as part of an NTN. A network node 180 may, in some cases, perform the functions of a base station 105, act as a bent-pipe satellite, or may act as a regenerative satellite, or a combination thereof. In other cases, network node 180 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, modulating the signal to be transmitted, or a combination thereof. For example, a bent-pipe satellite (e.g., network node 180) may receive a signal from a base station 105 and may relay the signal to a UE 115 or base station 105, or vice-versa.

Techniques described herein, in addition to or as an alternative to being carried out between UEs 115, base stations 105, and network nodes 180, may be implemented via additional or alternative wireless devices, including IAB nodes 104, distributed units (DUs) 165, CUs 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the distributed unit (DU) 165, and the radio unit (RU) 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

In some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 or other nodes (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to perform one or more of the techniques for prediction-based control information for wireless communications as described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of network nodes 180 or base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP) functionality and signaling. The at least one DU 165 and/or RU 170 may host lower layer, such as layer 1 (L1) and layer 2 (L2) (e.g., RLC, MAC, physical (PHY)) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to perform one or more techniques for prediction-based control information for wireless communications as described herein.

The UEs 115, the base stations 105, and the network nodes 180 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support prediction-based control information in a terrestrial or non-terrestrial network. In various examples, a UE 115 may include a communications manager 101. Additionally, or alternatively, a base station 105 may include a communications manager 102. In some cases, a network node 180 (e.g., an NTN device) may include a communications manager. The communications managers may support communications between the wireless devices. As described herein, the communications managers may support generation of predicted values of control parameters for wireless communications between the devices.

For example, a UE 115 may be configured with a prediction capability to predict values of control parameters based on a set of initial values of the control parameters and a channel condition model. The channel condition model may correspond to a function or curve that indicates or models a variation in channel conditions over time. In some examples, the channel condition models may model channels (e.g., satellite or NTN channels) associated with relatively predictable variations in channel conditions over time. The UE 115 may transmit a capability message to a network node 180 (e.g., or a base station 105) to indicate the prediction capability of the UE 115. The network node 180 may transmit first control signaling to the UE 115 to activate or enable the prediction capability of the UE 115. The first control signaling may additionally or alternatively indicate a configuration of multiple channel condition models for the UE 115. The channel condition models may be configured per cell, per UE 115, or per group of UEs 115 based on channel condition and UE 115 location. Each channel condition model may, in some examples, be defined according to a respective set of normalized model parameters (e.g., amplitude and duration).

The network node 180 may transmit second control signaling to the UE 115 to indicate a channel condition model from the set of multiple configured channel condition models and a set of initial values of the control parameters. For example, the second control signaling may indicate an index of the channel condition model from the set of multiple configured channel condition models. The network node 180 may transmit one or more other control messages or signals to the UE 115 to indicate model parameters associated with the channel condition model, a reference time associated with the channel condition model, and a validity duration associated with the channel condition model. The model parameters may correspond to parameters (e.g., a duration, amplitude) of the channel condition model that may be adjusted based on current conditions of the channel. For example, the UE 115 may transmit a measurement report to the network node 180 that indicates CSI, positioning information of the UE, or both, and the network node 180 may determine adjusted model parameters based on the measurement report.

The network node 180 and the UE 115 may thereby generate predicted values of control parameters for a time period based on the channel condition model and the initial values of the control parameters. The network node 180 and the UE 115 may communicate via the channel in accordance with the predicted values of the control parameters, which may provide for the network node 180 to transmit less control information to the UE 115, thereby reducing overhead and improving efficiency of the communications. It is to be understood that any device in the wireless communications system 100 may support the described techniques for prediction-based control information, such as a UE 115, a base station 105, a network node 180, and IAB node 104, or any other node, device, or entity.

Figure 2:
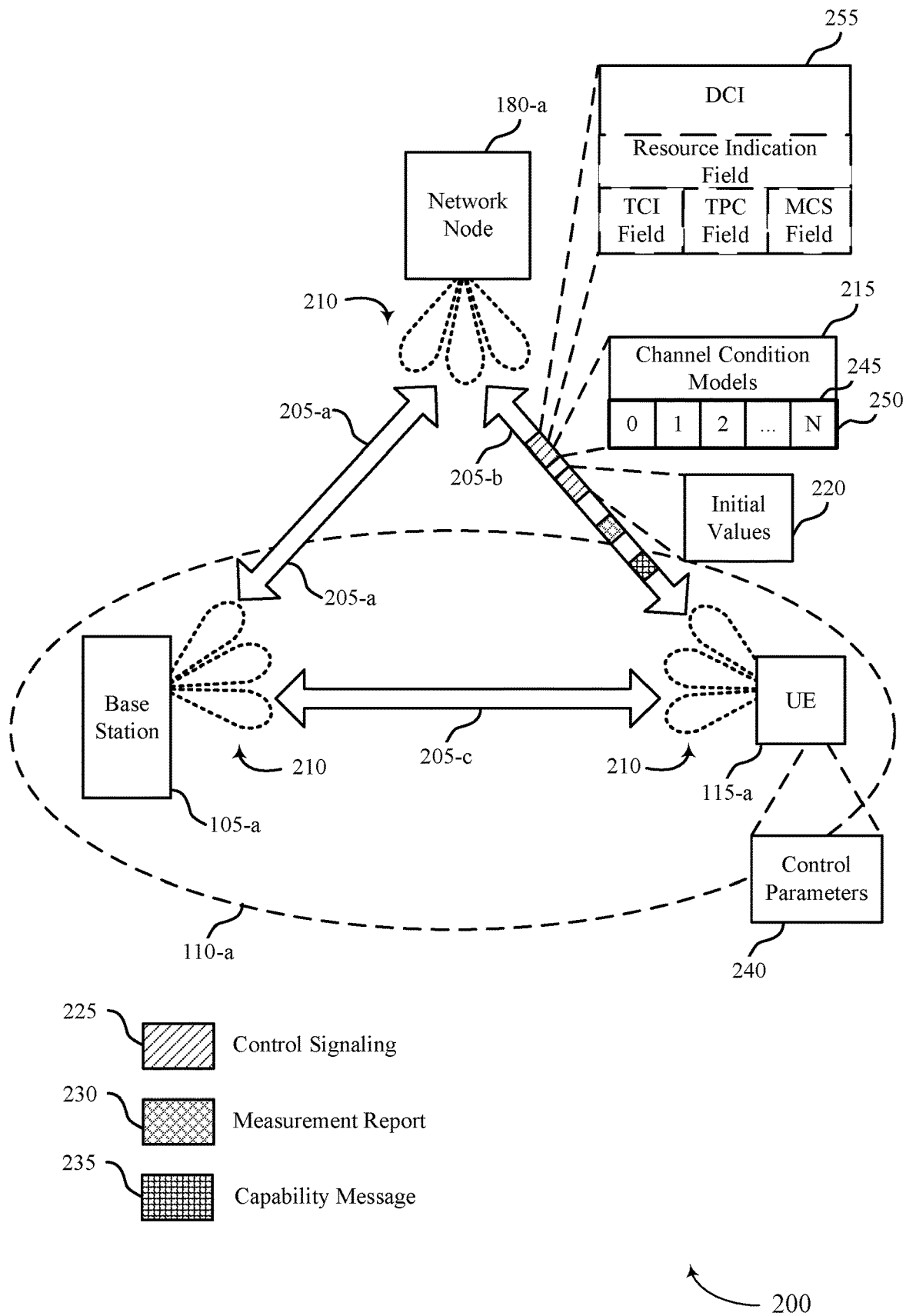
FIG. 2 illustrates an example of a wireless communications system that supports prediction-based control information for wireless communication in accordance with one or more aspects of the present disclosure.

FIG. 2 illustrates an example of a wireless communications system 200 that supports prediction-based control information for wireless communication in accordance with one or more aspects of the present disclosure. The wireless communications system 200 may implement or be implemented by aspects of the wireless communications system 100 as described with reference to FIG. 1. For example, the wireless communications system 200 may include a base station 105-a, a UE 115-a, and a network node 180-a, which may represent examples of a base station 105, a UE 115, and a network node 180 as described with reference to FIG. 1. The network node 180-a may communicate with the base station 105-a and the UE 115-a via communications links 205-a and 205-b, respectively (e.g., Uu links), and within a geographic coverage area 110-a. The base station 105-a and the UE 115-a may communicate within the geographic coverage area 110-a via a communication link 205-c.

The wireless communications system 200 may support beamformed communications. For example, each of the wireless devices in the wireless communications system 200 may include a respective set of beams 210 and may transition or sweep between the set of beams 210 to dynamically select a beam to use for communication. In the example of FIG. 2, the UE 115-a, the base station 105-a, the network node 180-a, or any combination thereof may support communications using a respective set of beams 210.

In some examples, the network node 180-a may be a node or entity of a terrestrial network, such as a control node, a base station 105, or some other terrestrial network entity. Additionally or alternatively, the network node 180-a may represent an example of a node or an entity of a non-terrestrial network, as described with reference to FIG. 1. For example, the network node 180-a may be any suitable type of communication satellite configured to relay communications between different end nodes in the wireless communication system 200. The base station 105-a may, in some cases, relay information and data between the network node 180-a and the UE 115-a. For example, the base station 105-a (e.g., a terrestrial node) may transmit or receive information or other signaling to and from the network node 180-a via the communication link 205-a, and the base station 105-a may forward or relay the information to or from the UE 115-a via the communication link 205-c (e.g., a Uu link).

Additionally or alternatively, the wireless communications system 200 may support direct transmissions between the UE 115-a and the network node 180-a via the communication link 205-b. For example, UE 115-a may transmit an uplink transmission to the network node 180-a. Conversely, by way of another example, the network node 180-a may transmit a downlink transmission or control signaling 225 to the UE 115-a. The network node 180-a may be in an orbit, such as low earth orbit, medium earth orbit, geostationary earth orbit, or other non-geostationary earth orbit. In any of these examples, the network node 180-a may be some distance from Earth (e.g., hundreds or thousands of kilometers from Earth), and therefore may be at least the same distance from the UE 115-a. Each communication (e.g., downlink transmission, uplink transmission) between the network node 180-a and the UE 115-a may therefore travel from Earth the distance to the network node 180-a and back to Earth.

The UE 115-a may receive control signaling 225 (e.g., DCI 255, other control messages, or both) from the network during communications. The control signaling 225 may indicate resource allocations for data transmission or reception by the UE 115-a. For example, the control signaling 225 may indicate one or more resource blocks, symbols, or other resources allocated for communications by the UE 115-a. The control signaling 225 may also indicate channel adaptation control parameters for communications by the UE 115-a. The control parameters 240 may include one or more parameters, such as an MCS, a beam indication (e.g., a TCI state), power control parameters (e.g., a TPC), or any combination thereof.

The UE 115-a may, in some cases, receive the control signaling 225 dynamically from the base station 105-a, the network node 180-a, or both. Each instance of the control signaling 225 may indicate a same or different set of control parameters 240 and resource allocations for the UE 115-a based on a current condition of a channel between the UE 115-a and the device in communication with the UE 115-a. The resource allocation information included in the control signaling 225 may be adjusted dynamically or semi-persistently based on a stability of the underlying data traffic. If the data traffic is random, the resource allocation information may be adjusted dynamically. If the data traffic is relatively stable or follows a pattern, the resource allocation information may be adjusted semi-persistently.

In some cases, channel conditions (e.g., parameters associated with a communications channel, such as channel gain, scattering, power decay, or other parameters) may vary randomly during communications. In some terrestrial networks, communications channels may be prone to random channel variation due to reflections caused by mobility. In such cases, the condition of the channel may be relatively difficult to predict. For example, a wireless device may predict the channel conditions for a relatively short time period (e.g., 200 ms or less), or the wireless device may be unable to predict how the channel conditions will vary. A UE 115 that communicates via channels with relatively large variation in channel conditions may receive the control signaling 225 relatively frequently to dynamically indicate adjusted communications parameters for the UE 115 to use for communications via the channel.

In the wireless communications system 200, the channel conditions between the UE 115-a and the network node 180-a may be relatively predictable. In some examples, the channel may be an NTN channel, and the network node 180-a may be an NTN network node 180-a, such as a satellite. The channel between the network node 180-a and the UE 115-a (e.g., a relatively high altitude or terrestrial node) may be a LoS channel. That is, the channel may not be subject to interference or reflections from other terrestrial objects. The network node 180-a may orbit the Earth according to a periodic or semi-periodic orbit. The UE 115-a may be able to predict the channel conditions of the channel between the UE 115-a and the network node 180-a based on the relatively predictable satellite orbit and the LoS conditions of the channel. If the network node 180-a is a high-speed network device, mobility of the UE 115-a may be ignored. That is, the channel gain and other channel conditions during a time when the UE 115-a is within the coverage of the network node 180-a (e.g., a satellite beam of the network node 180-a) may be predicted or estimated.

In some systems, such as NTN systems, channel capacity may be relatively limited. For example, in NTN systems, a channel between an NTN node and a device, which may be referred to as a satellite channel, may include less capacity than a channel in a terrestrial network. Additionally or alternatively, satellite-based communication may be relatively costly. In some examples, there may be a relatively high cost for each bit transmitted per frequency spectrum. A channel coupling gain of a satellite channel may be relatively low (e.g., less than a terrestrial network). To improve coverage, the NTN and the wireless device may utilize relatively high transmission powers to communicate via the channel, which may consume battery power and decrease spectral efficiency (e.g., due to an increase in coding redundancy). As such, reduced signaling overhead in such systems may reduce costs and complexity.

The wireless communications system 200 may support reduced capability devices (e.g., RedCap UEs 115), IoT devices, or both. For example, the wireless communications system 200 may, in some examples, support an NTN-based IoT design. Additionally or alternatively, the UE 115-a may be a reduced capability UE 115-a that is associated with a relatively small form factor and battery capacity. Improved coverage and reduced power consumption for communications within the wireless communications system 200 may provide support for such IoT or reduced capability applications.

Techniques described herein provide for wireless devices within the wireless communications system 200 to utilize predictable channel conditions to predict, or generate, control parameters 240 for communications via the channel. By predicting the control parameters 240, the devices may reduce signaling overhead by transmitting and receiving the control signaling 225 less frequently, by including less information in each control signal, or both. Each of the network node 180-a, the base station 105-a, the UE 115-a, or any combination thereof may support generation or prediction of the control parameters 240 using a channel condition model 215 and a set of initial values 220 of the control parameters 240. The control parameters 240 may include, for example, an MCS, a beam indication (e.g., a TCI state), power control parameters (e.g., a TPC), other control parameters 240, or any combination thereof.

A capability of a wireless device to support the prediction-based control information may be referred to as a prediction capability herein. The prediction capability may be configured at a wireless device and may indicate a capability of the wireless device to generate or predict the control parameters 240 for wireless communications based on an indicated channel condition model 215 and a set of initial values 220. In the example of FIG. 2, the UE 115-a may support the prediction capability. The UE 115-a may transmit a capability message 235 to the network node 180-a to indicate the prediction capability of the UE 115-a. The capability message 235 may be an example of a UE capability report, UE assistance information (UAI), or some other message that indicates the prediction capability of the UE 115-a. The predication capability of the UE 115-a may be activated or enabled based on the configuration, or the UE 115-a may receive subsequent control signaling 225 that enables or disables the prediction capability at the UE 115-a.

The network node 180-a may transmit first control signaling 225 (e.g., an RRC message) to the UE 115-a in response to or based on receiving the capability message 235 indicating the prediction capability of the UE 115-a. The first control signaling 225 may activate the prediction capability of the UE 115-a. For example, the first control signaling 225 may trigger or enable the prediction capability at the UE 115-a, or the first control signaling 225 may indicate that the UE 115-a is to use the prediction capability to predict control parameters 240 for subsequent communications, or both. The network node 180-a may transmit subsequent control messages to dynamically enable or disable the prediction capability of the UE 115-a. For example, the network node 180-a may transmit the control messages to indicate, to the UE 115-a, which control parameters the UE 115-a may predict or a time at which the UE 115-a may start or end the predictions or both.

The first control signaling 225 may, in some examples, indicate a set 250 of channel condition models 215 for the UE 115-a. For example, the network may configure a set 250 of channel condition models 215 for the UE 115-a via an RRC configuration. The set 250 of channel condition models 215 may be configured for the UE 115-a (e.g., a UE-specific message), for a group of UEs 115 that includes the UE 115-a (e.g., a group common configuration), for each UE 115 that is located within a cell supported by the network node 180-a (e.g., a cell-specific configuration), or any combination thereof. Multiple UEs 115 within a same cell, or a same geographic coverage area 110, may experience similar channel variations during communications with the network node 180-a. As such, the network node 180-a may transmit the first control signaling 225 to each of the UEs 115 via a broadcast or cell-specific or group common configuration, which may reduce overhead associated with the RRC signaling.

The network node 180-a may transmit second control signaling 225 (e.g., a MAC-CE, a DCI message 255, a control message transmitted via a physical downlink control channel (PDCCH), or any combination thereof) to the UE 115-a to indicate a channel condition model 215 for the UE 115-a. If the network node 180-a previously indicated or configured a set 250 of channel condition models 215 for the UE 115-a via the first control signaling 225, the network node 180-a may indicate an index 245 to a channel condition model 215 from the set 250 of channel condition models 215 via the second control signaling 225 (e.g., an index 245 of a set of indices 0, 1, 2, ... N, where N−1 may represent a quantity of channel condition models 215 in the set 250). The model index 245 may be specific to the UE 115-a, and may be indicated or configured via a UE-specific control message, such as a MAC-CE or a UE-specific PDCCH message.

In some examples, the second control signaling 225 may include a MAC-CE that provides a single model index 245 to the UE 115-a, and the UE 115-a may determine which channel condition model 215 to use based on the model index 245. Additionally or alternatively, the second control signaling 225 may include a first control message (e.g., a MAC-CE) that indicates a subset of multiple channel condition model indices 245 to the UE 115-a from the multiple indices 245 associated with the set 250 of configured channel condition models 215 indicated via the first control signaling 225. A second control message within the second control signaling 225 (e.g., a PDCCH) may indicate a single model index 245 from the subset of indices 245 for the UE 115-a to use.

The channel condition model 215 that is indicated to the UE 115-a via the first control signaling 225 or the second control signaling 225 or both may correspond to a normalized function that models or indicates a state of a channel between the UE 115-a and the network node 180-a over time. For example, the normalized function may indicate a shape or curve that the channel gain is expected to follow over a time period. The normalized function may be based on a pattern of an orbit of the network node 180-a, based on one or more LoS parameters associated with the channel, or both. Each channel condition model 215 may be configured according to a set of normalized model parameters, such as a normalized amplitude and duration. Example channel condition models 215 are illustrated and described in further detail with reference to FIGS. 3A-3C.

The second control signaling 225 may additionally or alternatively indicate initial values 220 of each of the control parameters 240. In some examples, the second control signaling 225 may include a first control message that indicates the channel condition model 215 and a second control message that indicates the set of initial values 220. The initial values 220 of the control parameters 240 may be based on channel conditions at the UE 115-a and may change more frequently than the channel condition model 215 and parameters associated with the channel condition model 215. As such, the set of initial values 220 may, in some examples, be indicated via a DCI message 255. For example, the UE 115-a may transmit one or more measurement report messages 230 that indicate the channel conditions, and the network node 180-a may transmit the second control signaling 225 (e.g., the DCI message 255) to indicate the set of initial values 220 based on the measurement report messages 230.

The measurement report messages may indicate CSI associated with the channel between the UE 115-a and the network node 180-a, one or more signal strength or signal quality metrics associated with the channel (e.g., a Layer 1 RSRP measurement), position information associated with the UE 115-a (e.g., a location, and acceleration), or any combination thereof. The network node 180-a may determine the initial values 220 of each of the control parameters 240 based on the reported channel conditions and indicate the initial values 220 to the UE 115-a.

The DCI message 255 that indicates the initial values 220 may include one or more fields to convey the initial value 220 of the control parameters 240. For example, the DCI 255 may include an MCS field, a TPC field, a resource indication field, a beam indication field, or one or more other fields. The MCS values may be indicated to the UE 115-a via an MCS field in the DCI 255 (e.g., a "modulation and coding scheme" field in DCI formats 01, 0_1, and 0_2 for uplink data scheduling, in DCI formats 1_0, 1_1, and 1_2 for downlink data scheduling), or via an MCS field in a sidelink control information (SCI) for sidelink data scheduling (e.g., SCI 1-A). The power control parameters may be indicated via a TPC field in the DCI 255 (e.g., a TPC command for scheduled physical uplink shared channel (PUSCH) in DCI formats 0_0, 01, and 0_2 for uplink data scheduling). The beam information may be indicated via a TCI field in the DCI (e.g., DCI formats 1_1 and 1_2).

The UE 115-a and the network node 180-a may utilize the initial values 220 to generate the values of the control parameters 240 using the channel condition model 215. For example, the initial values 220 may provide a starting or reference point for calculating the values of the control parameters 240 using the function associated with the channel condition model 215. In some examples, the indication of the initial values may activate or enable the predication capability (e.g., a prediction mechanism) at the UE 115-a.

In some examples, the set of initial values 220 may be jointly determined by the network node 180-a and the UE 115-a based on the model index, a reference time associated with the channel condition model 215, and one or more model parameters associated with the channel condition model 215. In such cases, the network node 180-a may refrain from transmitting the DCI 255 to indicate the set of initial values 220.

The UE 115-a may receive one or more other control messages via the first control signaling 225, the second control signaling 225, or some other signaling that indicate one or more parameters associated with the control-based prediction information. For example, the UE 115-a may receive a control message or other control signaling 225 that indicates model parameters for the channel condition model 215. The model parameters may include values of an amplitude or a duration or both of the channel condition model 215 that may be adjusted based on channel conditions. The UE 115-a may use the model parameters to calculate or generate the values of the control parameters 240 for communications.

The UE 115-a may receive an RRC message (e.g., a UE-specific RRC message) that configures a set of model parameters or one or more factors for adjusting the normalized model parameters to model parameters that may be used by the UE 115-a to predict control information. In some examples, the RRC message may configure multiple sets of model parameters for each channel condition model 215 configured for the UE 115-a. For example, if the first control signaling 225 indicates or configures multiple channel condition models 215, each channel condition model 215 may be associated with a respective set of model parameters. In such cases, the UE 115-a may receive a subsequent control message (e.g., DCI 255 or a MAC-CE) that indicates an index to a set of model parameters from the multiple configured sets of model parameters for the UE 115-a to use.

The UE 115-a may additionally or alternatively receive a control message via the first control signaling 225, the second control signaling 225, or some other signaling, that indicates a reference time associated with the channel condition model 215. The reference time may correspond to a reference location on the model curve of the channel condition model 215 for the UE 115-a. The UE 115-a may calculate an output of the channel condition model 215 based on a time difference between a current time and the reference time. The reference time, the model parameters, or both may be described in more detail with reference to FIG. 3.

The UE 115-a may begin predicting the values of the control parameters 240 in response to receiving the indications of the channel condition model 215, the model parameters, the initial values 220, and the reference time. The UE 115-a may generate multiple values of the control parameters 240 over a time period based on the function associated with the channel condition model 215. That is, the UE 115-a may apply each of the model parameters, the initial values 220, and the difference between a current time and the reference time to the indicated channel condition model 215 (e.g., a normalized function or curve). An output of the calculation may include sets of values of each of the control parameters 240, which may correspond to estimates or predictions of the control parameters 240 over a time period. The network node 180-a may also generate, or predict, the values of the control parameters 240 over the time period based on the channel condition model 215 and associated parameters.

The network node 180-a may transmit, to the UE 115-a, a control message that indicates the time period for utilizing the channel condition model 215. The time period may be referred to as a validity duration. The validity duration may be configured for and indicated to the UE 115-a via a control message, such as a cell-specific RRC message, a UE-specific RRC message, or a MAC-CE. Additionally or alternatively, the validity duration may be configured by the network node 180-a for the respective channel condition model 215. For example, the network node may configure a respective validity duration for each channel condition model 215. The validity duration may correspond to a time period within which the prediction capability may be activated at the UE 115-a. Additionally or alternatively, the validity duration may correspond to a time period over which the UE 115-a may use the indicated channel condition model 215 to predict the control parameters 240.

The validity duration (e.g., a timer associated with the validity duration) may start in response to the UE 115-a receiving an indication of the channel condition model 215 (e.g., the model index), the reference time, and one or more parameters associated with the channel condition model 215. That is, the validity duration may start once the UE 115-*a* receives sufficient information to utilize the channel condition model 215 for prediction. The UE 115-*a* and the network node 180-*a* may thereby communicate via a channel in accordance with the predicted values of the control parameters for at least the validity duration. In some examples, an expiration or end of the validity duration may de-activate or disable the prediction capability at the UE 115-*a*. The communications may include uplink data, downlink data, control information, or other communications.

The UE 115-*a* may predict the control parameters 240, including one or more of an MCS, beam information, power control parameters, or any combination thereof based on the channel condition model 215. The network node 180-*a* may refrain from indicating the values of the control parameters 240 to the UE 115-*a* due to the UE 115-*a* generating the values of the control parameters based on the channel condition model 215. Such techniques may reduce overhead and improve spectral efficiency. For example, the network node 180-*a* may transmit DCI 255 or other control information to the UE 115-*a* to schedule communications during the validity duration, and the DCI 255 may be transmitted less frequently or the DCI 255 may include less control information or both during the validity duration than if the UE 115-*a* did not support prediction-based control information.

If the prediction capability is enabled at the UE 115-*a*, the network node 180-*a* may transmit a first DCI message 255 to the UE 115-*a* to indicate the initial values 220 of the control parameters 240, and the first DCI message 255 may include an MCS field, a TCI field, and a TPC field, as previously described. Subsequent DCI messages 255 may include resource allocation fields that indicate time and frequency resources allocated for the communications. The subsequent DCI messages 255 may include a reduced capacity to reduce overhead. Such DCI messages 255 may be referred to as a compact DCI 255, in some examples. The subsequent DCI messages 255 may not include one or more fields for indicating control information. For example, one or more of the MCS field, the TCI field, and the TPC field may be removed from the subsequent scheduling DCI messages 255 when the prediction capability of the UE 115-*a* is enabled. Additionally or alternatively, the one or more fields may be repurposed to indicate other information. For example, one or more of the control information fields in the DCI 255 may be repurposed to indicate HARQ processes with a larger value range of the HARQ identifier (ID). Indicating more HARQ processes may, for example, support relatively long round trip times associated with communications (e.g., communications between a non-terrestrial device and a terrestrial device).

The compact DCI messages 255 may be applied to dynamic scheduling, semi-persistent (SPS) scheduling, and configured grant-based scheduling. For dynamic scheduling, a first scheduling DCI 255 may include the fields to convey the initial values 220 of the control parameters 240, and scheduling DCI messages 255 for subsequent data transmissions may not include the fields, or the fields may be repurposed within the subsequent scheduling DCI messages 255. For downlink and configured grant uplink communications according to SPS scheduling, the prediction-based control information may apply for a transmission duration upon activation of the transmission. For example, the DCI fields for indicating the control parameters 240 may be included within a first activation DCI 255 to indicate the initial values 220 and may be removed or repurposed in subsequent reactivation DCIs 255 (e.g., frequency of reactivation to update the control information may be reduced).

In some examples, the network node 180-*a* and the UE 115-*a* may utilize one or more channel condition models 215 to predict values of the control parameters 240 per HARQ process, across HARQ processes, per SRI, or any combination thereof. The network node 180-*a* may indicate, to the UE 115-*a*, a scope or applicability of the prediction capability of the UE 115-*a* and which control parameters 240 are to be predicted using each channel condition model 215. In some examples, the network node 180-*a* may indicate that the predication capability may be applied per HARQ process. The UE 115-*a* may generate values of one or more of the control parameters within the HARQ process. That is, the UE 115-*a* may communicate a first transmission, a retransmission, or both that are associated with a same HARQ ID based on the predicted values of the control parameters 240. In such cases, the one or more control parameters 240 may include an MCS, beam information, uplink power control parameters, or any combination thereof. The beam information may include receive beam information. The UE 115-*a* may determine transmit beam information based on uplink-downlink transmit and receive beam correspondence.

In some examples, the network node 180-*a* may indicate that the prediction capability may be applied across HARQ processes. In such cases, the one or more control parameters may include the MCS, beam information, and uplink power control parameters. Each HARQ process may be associated with the same or different quality of service (QoS) requirements. The UE 115-*a* may perform the prediction of the control parameters 240 according to a same configuration (e.g., a same channel condition model) across each HARQ process regardless of the QoS requirements. Alternatively, the UE 115-*a* may adapt the prediction model based on the QoS requirements.

In some examples, the network node 180-*a* may indicate that the prediction capability may be applied per SRI. If the prediction capability is activated or deactivated per SRI, the one or more control parameters 240 predicted by the UE 115-*a* may include uplink power control parameters. The UE 115-*a* may, in some cases, be configured with a set of uplink power control parameters per SRS resource. Each SRS resource may be identified by a respective SRI. As such, uplink power control predictions may be performed separately or differently for each SRI. In some other examples, the prediction capability may be an optional feature at the UE 115-*a*. For example, the UE 115-*a* may optionally activate or deactivate the prediction capability based on one or more parameters or metrics associated with the UE 115-*a*.

The UE 115-*a* and the network node 180-*a* may thereby support prediction-based control information for communications. It is to be understood that the described techniques for indicating and utilizing channel condition models 215 to support generation of predicted control parameters 240 may be performed by any wireless device. For example, the described techniques may be performed for communications between any combination of terrestrial and non-terrestrial wireless devices or nodes.

The described techniques for prediction-based control information may reduce overhead and increase spectral efficiency to provide support for IoT communications, communications with reduced capability devices, or both. Additionally or alternatively, the described techniques may reduce link budget requirement for a PDCCH and provide for more efficient and reliably communications via an NTN satellite channel.

Figure 3A:
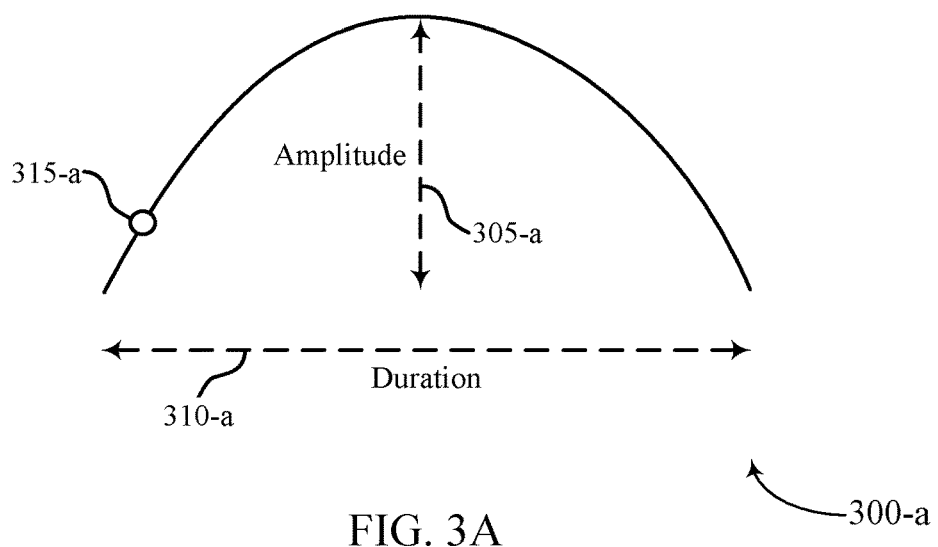
FIGS. 3A-3C illustrate examples of channel condition models that support prediction-based control information for wireless communication in accordance with one or more aspects of the present disclosure.
Figure 3B:
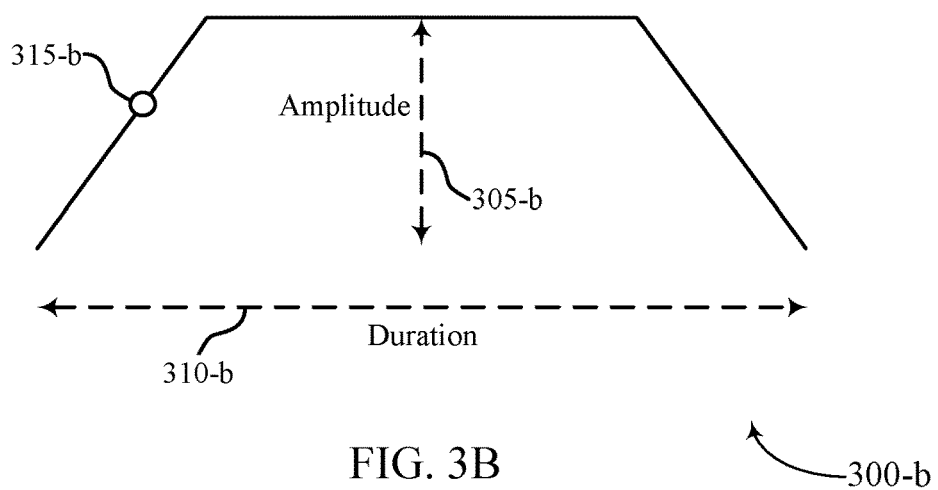
Figure 3C:
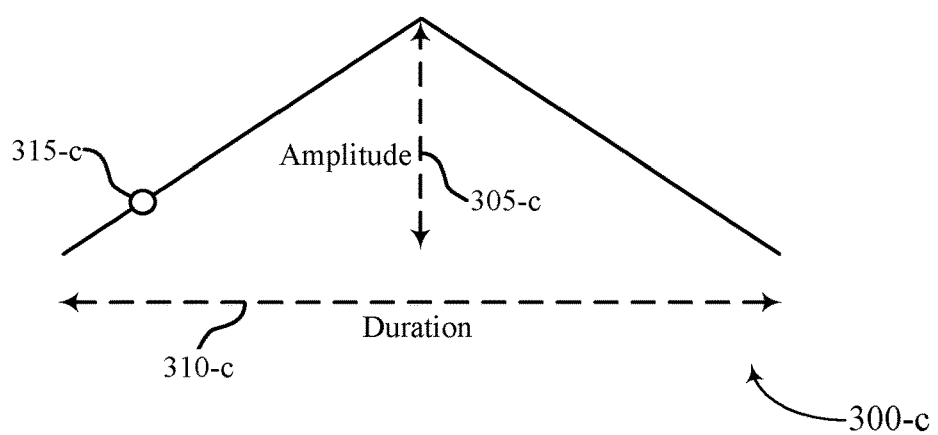

FIGS. 3A-3C illustrate examples of channel condition models 300 that support prediction-based control information for wireless communication in accordance with one or more aspects of the present disclosure. The channel condition models 300-a, 300-b, and 300-c may implement or be implemented by aspects of the wireless communications systems 100 and 200, as described with reference to FIGS. 1 and 2. For example, the channel condition models 300 may represent examples of the channel condition models 215 described with reference to FIG. 2. One or more wireless devices, such as a UE 115, a network node 180, a base station 105, or some other wireless device may utilize the channel condition models 300 to generate a set of values of one or more control parameters. The wireless devices may represent examples of corresponding devices as described with reference to FIGS. 1 and 2.

Although three example channel condition models 300 are illustrated in FIGS. 3A-3C, it is to be understood that channel conditions may be represented or modeled by any type of function or curve, including those illustrated in FIG. 3 and any other types of curves. For example, channel conditions may be modeled using any one of a linear function, a piece wise linear function, a quadratic function, a piecewise quadratic function, or some other function. The channel condition models 300 may be determined by a wireless device, such as a network node 180, a base station 105, or a UE 115, based on one or more predictable communications patterns, such as a periodic satellite orbit, a periodic movement of a wireless device, or one or more LoS conditions of a channel, or any combination thereof.

The channel condition models 300-a, 300-b, and 300-c may each be defined by one or more parameters. The one or more parameters may include a type of the model (e.g., a function), an amplitude 305 of the model, a duration 310 of the model (e.g., or one or more portions of the model) or any combination thereof. In some examples, the channel condition models 300 may represent examples of normalized channel condition models 300. That is, the channel condition models 300 may be defined according to one or more normalized parameters. A network node 180 may indicate the normalized channel condition models 300 to a UE 115. For example, the network node 180 may configure a set of channel condition models for a UE 115 or a group of UEs 115, and each channel condition model 300 of the set may be defined according to normalized parameters, as described with reference to FIG. 2. The UE 115 may thereby determine, based on the indication of the channel condition model 300, a normalized curve or shape that models variations in channel conditions over time.

As described in further detail with reference to FIG. 2 and FIG. 4, the network node 180 may subsequently transmit second control signaling to the UE 115 to indicate a channel condition model of the set of channel condition models. The second control signaling or another control message transmitted to the UE 115 may indicate one or more model parameters associated with the channel condition model 300 that may be adjusted according to current channel conditions of the channel between the UE 115 and the network node 180. As such, the normalized parameters of the channel condition models 300 illustrated in FIG. 3 may be adapted or scaled by a wireless device based on indicated model parameters (e.g., adjustment factors or scaling constants) before the wireless device utilizes the channel condition models 300 to generate predicted values of control parameters.

FIG. 3A illustrates a first example channel condition model 300-a. The channel condition model 300-a may follow a quadratic curve (e.g., a quadratic or piecewise quadratic curve). That is, an indication of the channel condition model 300-a to a wireless device may include an indication of a normalized quadratic function. The wireless device may determine, based on the indication of the normalized quadratic function associated with the channel condition model 300-a, that a gain or strength of the channel may vary over time according to a curve that is similar to a quadratic curve.

The channel condition model 300-a may be defined according to the amplitude 305-a and the duration 310-a. In some examples, the amplitude 305-a and the duration 310-a may be normalized. In such cases, a wireless device may receive subsequent control signaling that indicates scaling factors for adjusting the amplitude 305-a and the duration 310-a to adapt to current operating conditions of the channel. The current channel conditions may be reported to the network via a measurement report.

The channel condition model 300-a may be associated with a reference time 315-a. The reference time 315-a may, in some examples, be configured with the channel condition model 300-a (e.g., via RRC signaling). Additionally or alternatively, the reference time 315-a may be indicated to a UE 115 or another wireless device (e.g., a UE-specific parameter). The wireless device may calculate outputs of the channel condition model based on a difference between a current time of the device and the reference time 315-a. In the example of FIG. 3, time may increase along an x-axis as the duration 310-a of the channel condition model 300-a increases to the right of the page in FIG. 3A.

FIG. 3B illustrates a second example channel condition model 300-b. The channel condition model 300-b may follow a piecewise linear curve. That is, an indication of the channel condition model 300-b to a wireless device may include an indication of a piecewise linear function. The wireless device may determine, based on the indication of the piecewise linear function associated with the channel condition model 300-b, that a gain or strength of the channel may vary over time according to a curve that is similar to the piecewise linear curve.

The channel condition model 300-b may be defined according to the amplitude 305-b and the duration 310-b. Although a single amplitude 305-a and a single duration 310-b of the channel condition model 300-b are illustrated in FIG. 3B, it is to be understood that one or more additional parameters of the channel condition model 300-b may be indicated. For example, a respective function or slope of each portion of the piecewise linear curve may be indicated to a wireless device, or a respective duration of each portion, or both. In some examples, the amplitude 305-b and the duration 310-b may be normalized. In such cases, a wireless device may receive subsequent control signaling that indicates scaling factors for adjusting the amplitude 305-b and the duration 310-b to adapt to current operating conditions of the channel. The current channel conditions may be reported to the network via a measurement report.

The channel condition model 300-b may be associated with a reference time 315-b. The reference time 315-b may, in some examples, be configured with the channel condition model 300-b (e.g., via RRC signaling). Additionally or alternatively, the reference time 315-b may be indicated to a UE 115 or other wireless device (e.g., a UE-specific parameter). The wireless device may calculate outputs of the channel condition model based on a difference between a current time of the device and the reference time 315-b.

FIG. 3C illustrates a third example channel condition model 300-c. The channel condition model 300-c may follow a different piecewise linear curve. That is, an indication of the channel condition model 300-c to a wireless device may include an indication of a piecewise linear function. The wireless device may determine, based on the indication of the piecewise linear function associated with the channel condition model 300-c, that a gain or strength of the channel may vary over time according to a curve that is similar to the piecewise linear curve.

The channel condition model 300-c may be defined according to the amplitude 305-c and the duration 310-c. Although a single amplitude 305-c and a single duration 310-c of the channel condition model 300-c are illustrated in FIG. 3C, it is to be understood that one or more additional parameters of the channel condition model 300-c may be indicated. For example, a respective function or slope of each portion of the piecewise linear curve may be indicated to a wireless device, or a respective duration of each portion, or both. In some examples, the amplitude 305-c and the duration 310-c may be normalized. In such cases, a wireless device may receive subsequent control signaling that indicates scaling factors for adjusting the amplitude 305-c and the duration 310-c to adapt to current operating conditions of the channel. The current channel conditions may be reported to the network via a measurement report.

The channel condition model 300-c may be associated with a reference time 315-c. The reference time 315-c may, in some examples, be configured with the channel condition model 300-c (e.g., via RRC signaling). Additionally or alternatively, the reference time 315-c may be indicated to a UE 115 or other wireless device (e.g., a UE-specific parameter). The wireless device may calculate outputs of the channel condition model based on a difference between a current time of the device and the reference time 315-c.

The channel condition models 300-a, 300-b, and 300-c may thereby be example models that represent, estimate, or predict varying channel conditions over time. A wireless device may utilize any one of the channel condition models 300-a, 300-b, and 300-c, as well as a respective reference time 315, a set of initial values of control parameters, and a set of model parameters adjusted to current conditions of the channel to calculate or generate values of control parameters over the respective durations 310. The durations 310 may be the same as or different than a validity duration of the channel condition models 300, as described with reference to FIG. 2. The initial values of the control parameters may be used to indicate an offset of the channel condition models 300 in a y-axis (e.g., a vertical direction in FIG. 3).

Figure 4:
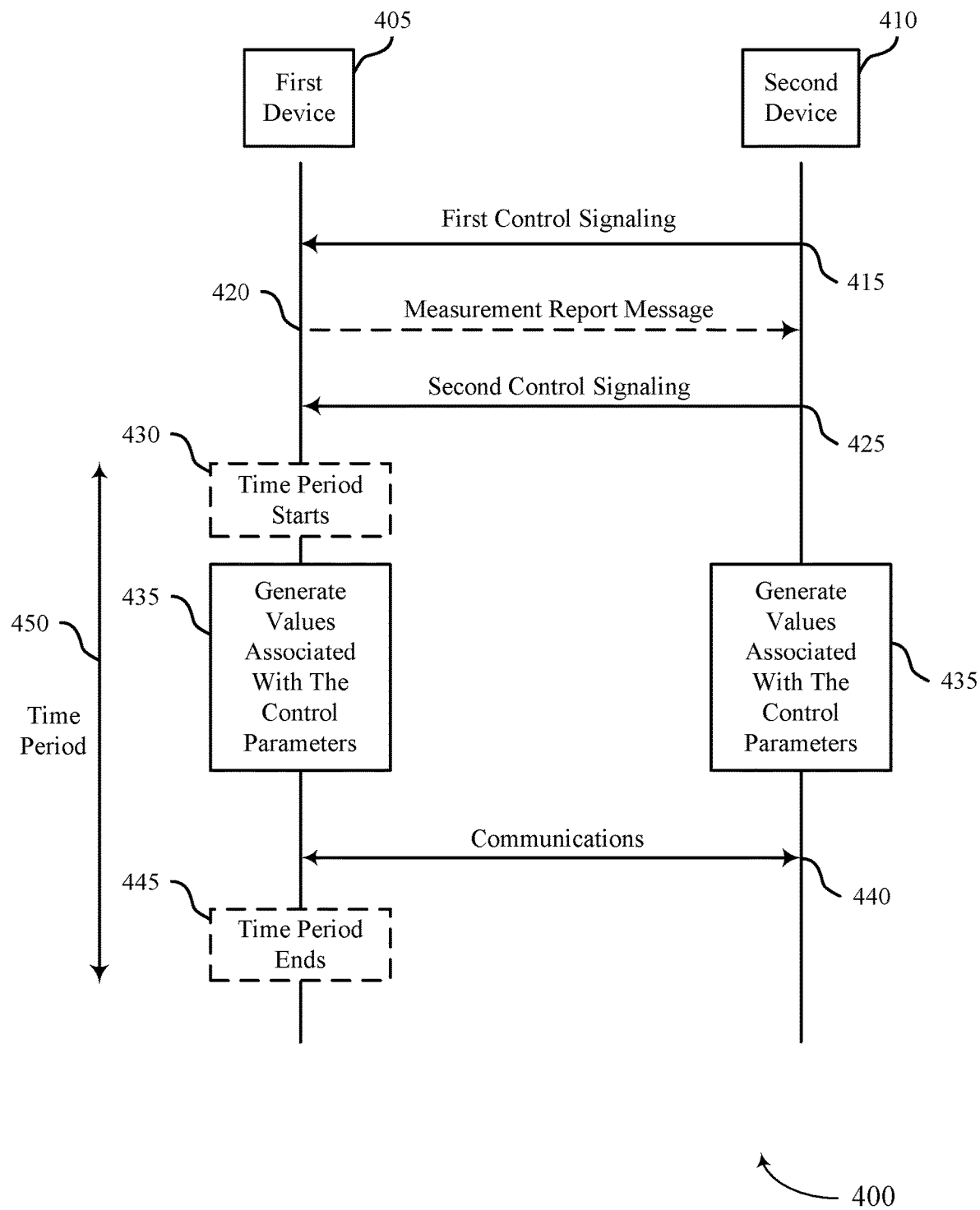
FIG. 4 illustrates an example of a process flow that supports prediction-based control information for wireless communication in accordance with one or more aspects of the present disclosure.

FIG. 4 illustrates an example of a process flow 400 that supports prediction-based control information for wireless communication in accordance with one or more aspects of the present disclosure. In some examples, the process flow 400 may implement or be implement by aspects of the wireless communications systems 100 or 200, and the channel condition models 300, as described with reference to FIGS. 1-3. For example, the process flow 400 may illustrate a first device 405 and a second device 410 exchanging signaling, generating values associated with a set of control parameters, and communicating in accordance with the control parameters, as described with reference to FIGS. 1-3.

The process flow 400 may include a first device 405 and a second device 410, which may be examples of corresponding devices as described herein. In particular, the first device 405 may represent an example of a UE 115 as described with reference to FIGS. 1-3, and the second device 410 may represent an example of a base station 105, a network node 180, or both, as described with reference to FIGS. 1-3. The second device may, in some examples, be a non-terrestrial device. Additionally or alternatively, the second device may be a terrestrial device. It is noted that the operations in the process flow 400 performed by the first device 405 and the second device 410 may be respectively performed by any other wireless device, and the example shown should not be construed as limiting. For instance, the operations shown as performed by the first device 405 and the second device 410 may be performed by any type of wireless device, including a UE 115, a base station 105, a network node 180, or some other devices.

In some examples, the operations illustrated in the process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 415, the second device 410 may transmit first control signaling to the first device 405. The first control signaling may activate a prediction capability of the first device to generate a set of control parameters for communications. In some examples, the first device 405 may transmit a capability message that indicates the prediction capability of the first device 405, and the second device 410 may transmit the first control signaling to activate the prediction capability of the first device 405 in response to the capability message.

In some examples, the first control signaling may be RRC signaling. The first control signaling may configure a set of channel condition models for the first device 405, or for a group of devices including the first device 405, as described with reference to FIG. 2. The first control signaling may indicate, for each channel condition model of the set, a type of the channel condition model or a set of parameters associated with the channel condition model or both. The type of the channel condition model may correspond to a normalized function or curve indicative of a state of a channel between the first device 405 and the second device 410 over a duration. The set of parameters associated with each channel condition model may include an amplitude, a duration, or both of the normalized function, as described with reference to FIG. 3.

At 420, in some examples, the first device 405 may transmit one or more measurement report messages to the second device 410. The one or more measurement report messages may include an indication of CSI associated with the channel between the first device 405 and the second device or position information associated with the first device 405, or both. In some examples, the measurement report messages may indicate an RSRP value (e.g., a Layer 1 RSRP) associated with the channel, a channel quality indicator (CQI), or both. The measurement report messages may be based on initial measurements and reports performed by the first device 405.

At 425, the second device 410 may transmit second control signaling to the first device 405. The second control signaling may indicate initial values of the set of control parameters and a channel condition model for the first device 405. The second control signaling may include a MAC-CE, a DCI message, a control message transmitted via a PDCCH, or any combination thereof. If the first control signaling configures a set of multiple channel condition models, the second control signaling may indicate an index of the channel condition model for the first device 405 from the set of multiple channel condition models. In some examples, to transmit the second control signaling, the second device 410 may transmit a first control message (e.g., a MAC-CE) that indicates a subset of indices of a subset of channel condition models and a second control message within the second control signaling (e.g., a PDCCH) that indicates the index of the channel condition model from the subset of indices.

The second control signaling may include a DCI message that indicates the initial values of the set of control parameters or the channel condition model for the first device 405 or both. For example, the DCI message may include one or more fields configured to convey the indication of the initial values, such as an MCS field, a TPC field, and a TCI state field, as described with reference to FIG. 2.

In some examples, the second device 410 may additionally transmit one or more other control messages as part of the first control signaling, the second control signaling, or some other control signaling to indicate a reference time associated with the channel condition model, a time period 450 associated with the channel condition model, a set of model parameters associated with the channel condition model, or any combination thereof. The channel condition model, the initial values, and the one or more other parameters may be determined by the second device 410 based on the channel information indicated via the measurement report messages.

At 430, in some examples, the first device 405 may start the time period 450. The time period 450 may be referred to as a validity duration herein. The first device 405 may start the time period 450 in response to or based on receiving sufficient information to generate or predict control information using the channel condition model. Sufficient information may include the indication of the channel condition model, the reference time, and the model parameters associated with the channel condition model. In some examples, starting the time period 450 may include starting a timer at the first device 405. A duration of the timer may be the same as the duration of the time period 450. In some examples, the second device 410 may additionally start or track the time period 450.

At 435, the first device 405 and the second device 410 may generate values associated with the set of control parameters over the time period 450. The first device 405 and the second device 410 may generate the values of the control parameters based on the initial values of the control parameters and the channel condition model. For example, the devices may input the model parameters, the initial values of the control parameters, and a difference between a current time and the reference time into the channel condition model (e.g., a function representative of the channel condition model). An output of the function may be the values of the control parameters over the time period 450. The time period 450 may, in some examples, include a duration that is the same as a duration of the channel condition model.

At 440, the first device 405 and the second device 410 may communicate for at least the time period 450 according to the generated values associated with the control parameters. The communicating may include transmitting or receiving uplink or downlink data. By communicating according to the generated, or predicted, values, the second device 410 may refrain from transmitting dynamic indications of the control parameters to the first device 405 during the communications as channel conditions vary. As described with reference to FIG. 2, in some examples, the second device 410 may transmit scheduling DCI or other scheduling control messages to schedule the communications, and the scheduling messages may include a reduced amount of control information to reduce overhead and improve spectral efficiency.

At 445, in some examples, the time period 450 may end. In some examples, an expiration of the time period 450 may deactivate or disable the prediction capability of the first device 405. That is, the first device 405 may refrain from generating values of the control parameters according to the channel condition model after the time period 450 ends. Additionally or alternatively, the first device 405 may continue to generate values of the control parameters after the time period 450 ends until the first device 405 receives other control signaling that indicates a different channel condition model, a set of values of the control parameters, or both.

Figure 5:
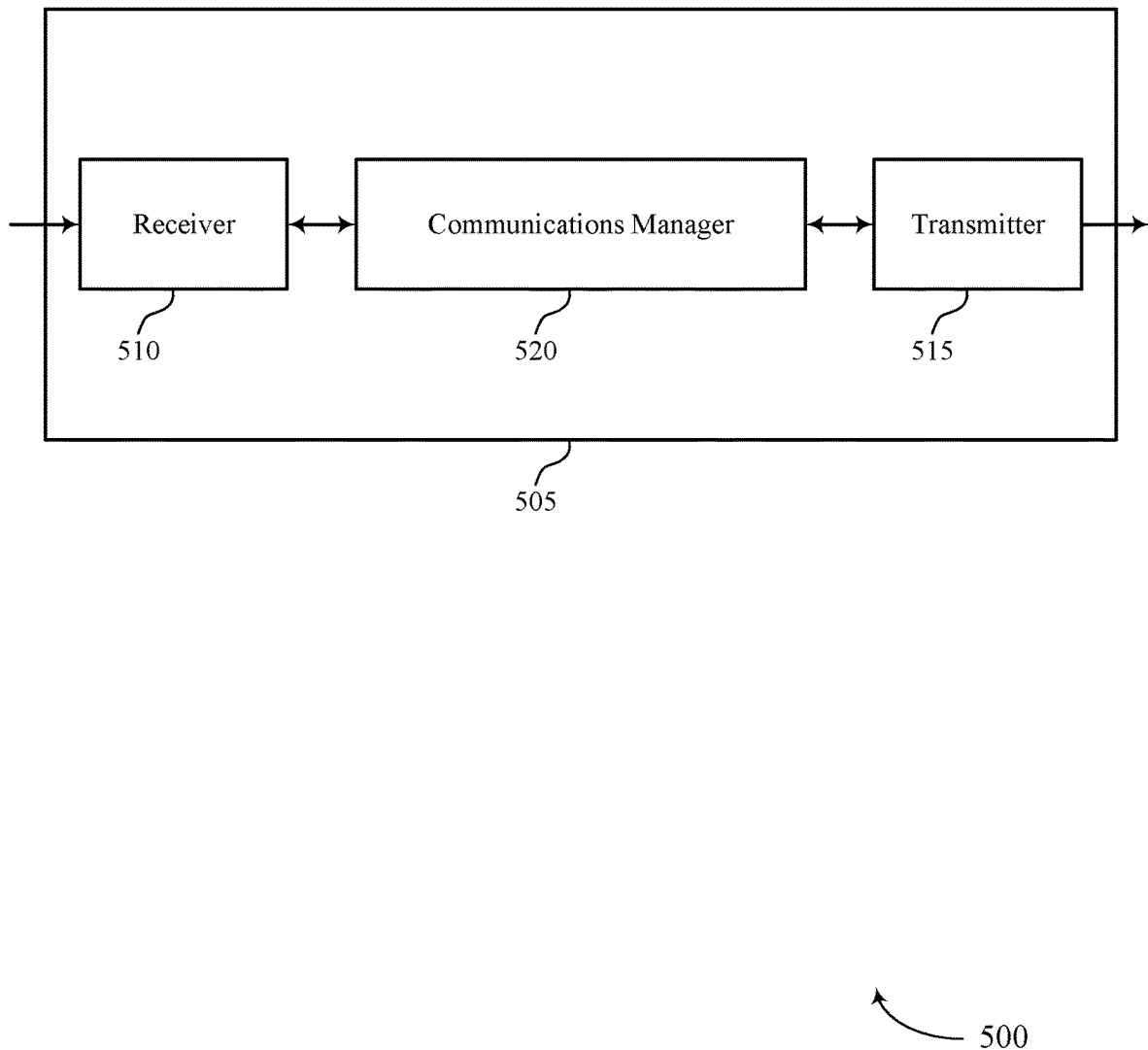
FIGS. 5 and 6 show block diagrams of devices that support prediction-based control information for wireless communication in accordance with one or more aspects of the present disclosure.

FIG. 5 shows a block diagram 500 of a device 505 that supports prediction-based control information for wireless communication in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to prediction-based control information for wireless communication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to prediction-based control information for wireless communication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of prediction-based control information for wireless communication as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device in accordance with examples as disclosed herein. For example, the communications manager 520 may be configured as or otherwise support a means for receiving first control signaling that activates a prediction capability of the first device to generate a set of one or more control parameters for communications. The communications manager 520 may be configured as or otherwise support a means for receiving second control signaling that indicates initial values of the set of one or more control parameters and a channel condition model for the first device. The communications manager 520 may be configured as or otherwise support a means for generating a set of multiple values associated with the set of one or more control parameters over a time period, the generated set of multiple values based on the initial values of the set of one or more control parameters and the channel condition model. The communications manager 520 may be configured as or otherwise support a means for communicating with a second device during at least the time period according to the generated set of multiple values associated with the set of one or more control parameters.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources. The device 505 may support prediction-based control information as described herein, such that the processor of the device 505 may generate, or calculate, values of control parameters over a time period. By predicting the values of the control parameters, the processor of the device 505 may refrain from transmitting or receiving dynamic control information related to the control parameters, which may reduce control signaling overhead and improve a link budget. For example, the processor of the device 505 may transmit or receive an initial control message that indicates a set of initial values of the control parameters, and subsequent control messages may indicate resource scheduling information, but may not indicate values of the control parameters. As such, the subsequent control messages may include a reduced capacity, which may reduce overhead, processing, and improve utilization of communication resources. By transmitting and receiving less control information, the processor of the device 505 may consume less power.

Figure 6:
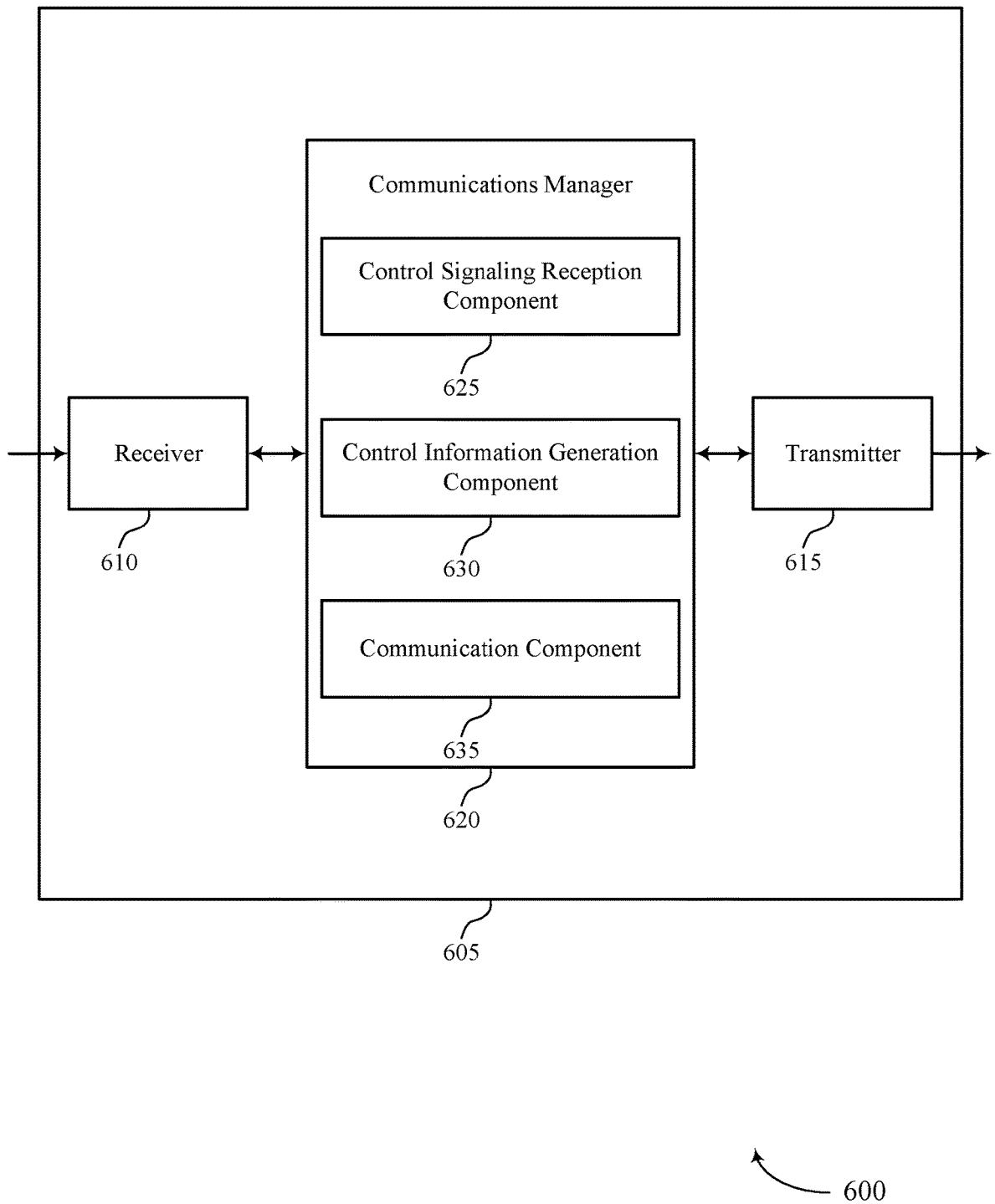

FIG. 6 shows a block diagram 600 of a device 605 that supports prediction-based control information for wireless communication in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to prediction-based control information for wireless communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to prediction-based control information for wireless communication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of prediction-based control information for wireless communication as described herein. For example, the communications manager 620 may include a control signaling reception component 625, a control information generation component 630, a communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. The control signaling reception component 625 may be configured as or otherwise support a means for receiving first control signaling that activates a prediction capability of the first device to generate a set of one or more control parameters for communications. The control signaling reception component 625 may be configured as or otherwise support a means for receiving second control signaling that indicates one or more initial values of the set of one or more control parameters and a channel condition model for the first device. The control information generation component 630 may be configured as or otherwise support a means for generating a set of multiple values associated with the set of one or more control parameters over a time period, the generated set of multiple values based on the one or more initial values of the set of one or more control parameters and the channel condition model. The communication component 635 may be configured as or otherwise support a means for communicating with a second device during at least the time period according to the generated set of multiple values associated with the set of one or more control parameters.

Figure 7:
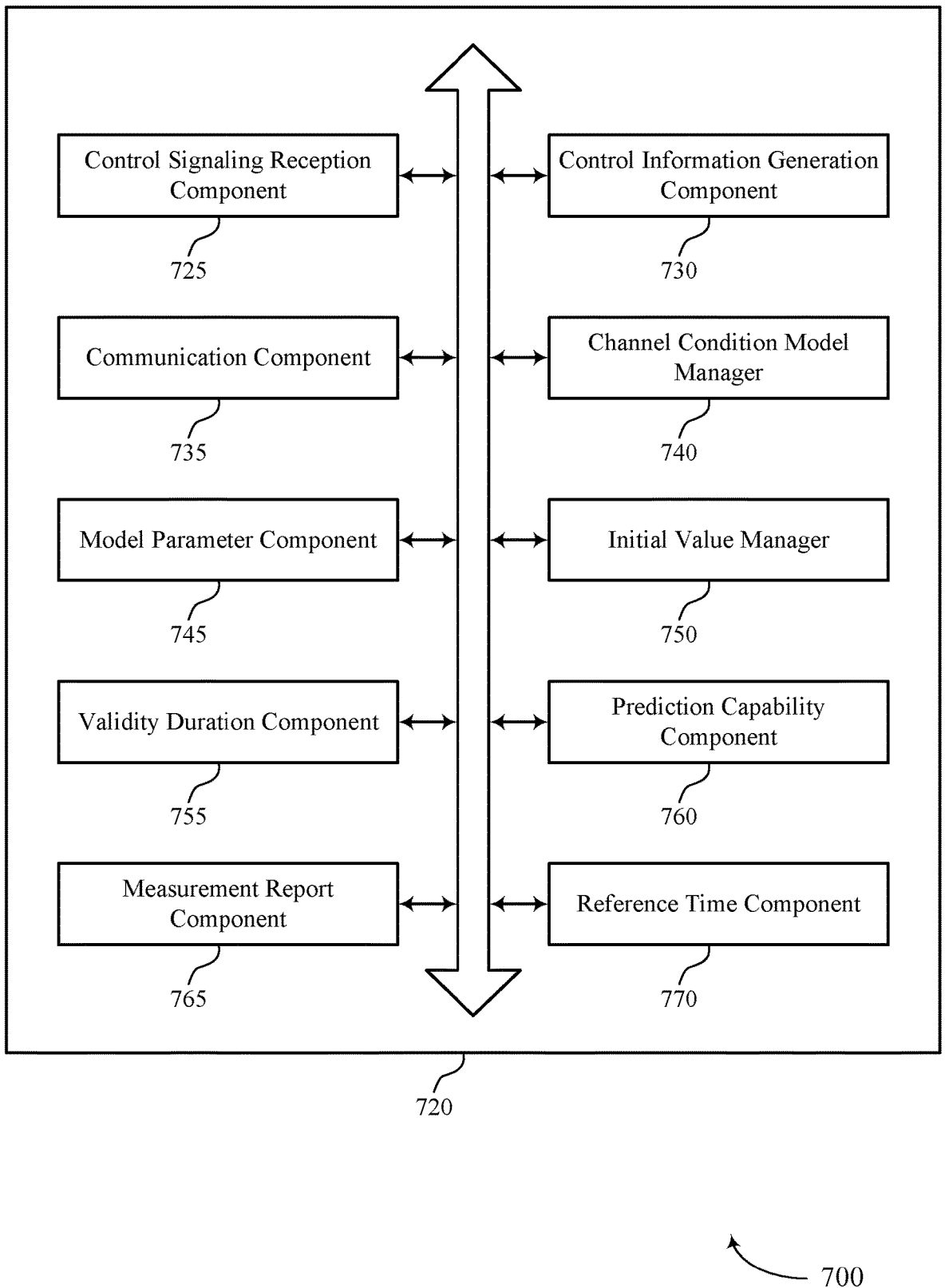
FIG. 7 shows a block diagram of a communications manager that supports prediction-based control information for wireless communication in accordance with one or more aspects of the present disclosure.

FIG. 7 shows a block diagram 700 of a communications manager 720 that supports prediction-based control information for wireless communication in accordance with one or more aspects of the present disclosure. The communications manager 720 may be an example of aspects of a communications manager 520, a communications manager 620, or both, as described herein. The communications manager 720, or various components thereof, may be an example of means for performing various aspects of prediction-based control information for wireless communication as described herein. For example, the communications manager 720 may include a control signaling reception component 725, a control information generation component 730, a communication component 735, a channel condition model manager 740, a model parameter component 745, an initial value manager 750, a validity duration component 755, a prediction capability component 760, a measurement report component 765, a reference time component 770, or any combination thereof. Each of these components may communicate, directly or indirectly, with one another (e.g., via one or more buses).

The communications manager 720 may support wireless communication at a first device in accordance with examples as disclosed herein. The control signaling reception component 725 may be configured as or otherwise support a means for receiving first control signaling that activates a prediction capability of the first device to generate a set of one or more control parameters for communications. In some examples, the control signaling reception component 725 may be configured as or otherwise support a means for receiving second control signaling that indicates one or more initial values of the set of one or more control parameters and a channel condition model for the first device. The control information generation component 730 may be configured as or otherwise support a means for generating a set of multiple values associated with the set of one or more control parameters over a time period, the generated set of multiple values based on the one or more initial values of the set of one or more control parameters and the channel condition model. The communication component 735 may be configured as or otherwise support a means for communicating with a second device during at least the time period according to the generated set of multiple values associated with the set of one or more control parameters.

In some examples, to support receiving the first control signaling, the channel condition model manager 740 may be configured as or otherwise support a means for receiving, via the first control signaling, an indication of a set of multiple channel condition models including at least the channel condition model. In some examples, to support receiving the second control signaling, the channel condition model manager 740 may be configured as or otherwise support a means for receiving, via the second control signaling, an indication of an index of the channel condition model from the set of multiple channel condition models.

In some examples, to support receiving the second control signaling, the channel condition model manager 740 may be configured as or otherwise support a means for receiving a first control message that indicates a subset of indices of a subset of channel condition models from the set of multiple channel condition models. In some examples, to support receiving the second control signaling, the channel condition model manager 740 may be configured as or otherwise support a means for receiving a second control message that indicates an index of the channel condition model for the first device from the subset of indices.

In some examples, the first control signaling indicates a respective type or a respective set of parameters or both associated with each channel condition model of the set of multiple channel condition models, the respective type corresponding to a normalized function indicative of a state of a channel between the first device and the second device, and the respective set of parameters including an amplitude or a duration or both of the normalized function.

In some examples, to support receiving the second control signaling, the model parameter component 745 may be configured as or otherwise support a means for receiving, via the second control signaling, a set of one or more model parameters associated with the channel condition model, the set of one or more model parameters including a duration of the channel condition model, an amplitude of the channel condition model, or both.

In some examples, the model parameter component 745 may be configured as or otherwise support a means for receiving a first control message that configures a set of multiple sets of model parameters associated with a set of multiple channel condition models. In some examples, the model parameter component 745 may be configured as or otherwise support a means for receiving, via the second control signaling, an indication of the set of one or more model parameters associated with the channel condition model from the set of multiple sets of model parameters configured by the first control message.

In some examples, to support generating the set of multiple values associated with the set of one or more control parameters, the control information generation component 730 may be configured as or otherwise support a means for generating the set of multiple values associated with the set of one or more control parameters over the time period in accordance with the channel condition model and based on a difference between a current time and a reference time associated with the channel condition model. In some examples, the reference time component 770 may be configured as or otherwise support a means for receiving a control message that indicates the reference time for the first device.

In some examples, to support receiving the second control signaling, the initial value manager 750 may be configured as or otherwise support a means for receiving a DCI message that indicates the one or more initial values of the set of one or more control parameters and the channel condition model for the first device. In some examples, to support receiving the second control signaling, the validity duration component 755 may be configured as or otherwise support a means for starting a timer in response to receiving the DCI, a duration of the timer based on the time period. In some examples, the validity duration component 755 may be configured as or otherwise support a means for receiving a control message that indicates the time period for the first device.

In some examples, the control signaling reception component 725 may be configured as or otherwise support a means for receiving, during the time period, one or more DCI messages that indicate resource allocations for the communications between the first device and the second device, each DCI message of the one or more DCI messages including a resource indication field and excluding an MCS field, a TPC field, a TCI field, or any combination thereof based on the prediction capability of the first device.

In some examples, to support receiving the first control signaling, the prediction capability component 760 may be configured as or otherwise support a means for receiving, via the first control signaling, an indication that the prediction capability of the first device is activated for a first HARQ process, activated for a set of multiple HARQ processes, activated per SRI, or any combination thereof. In some examples, the prediction capability component 760 may be configured as or otherwise support a means for transmitting, to the second device, a capability message that indicates the prediction capability of the first device.

In some examples, the measurement report component 765 may be configured as or otherwise support a means for transmitting, to the second device, one or more measurement report messages including an indication of CSI associated with a channel between the first device and the second device or position information associated with the first device or both, the channel condition model based on the one or more measurement report messages.

In some examples, the set of one or more control parameters includes MCS parameters, beam parameters, uplink power control parameters, or any combination thereof. In some examples, the first control signaling includes RRC signaling. In some examples, the second control signaling includes second RRC signaling, a MAC-CE, DCI, a downlink control channel message, or any combination thereof.

Figure 8:
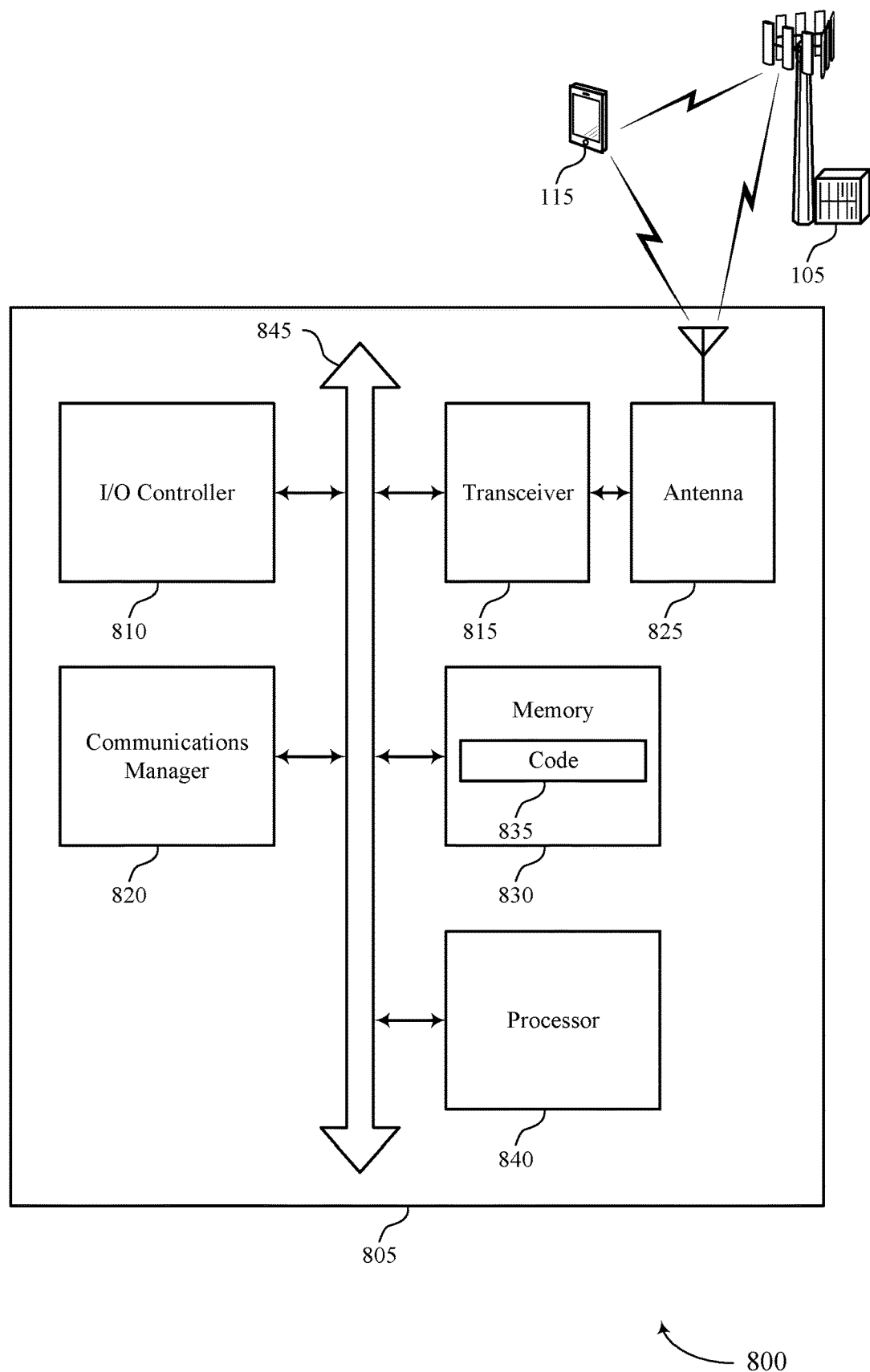
FIG. 8 shows a diagram of a system including a device that supports prediction-based control information for wireless communication in accordance with one or more aspects of the present disclosure.

FIG. 8 shows a diagram of a system 800 including a device 805 that supports prediction-based control information for wireless communication in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting prediction-based control information for wireless communication). For example, the device 805 or a component of the device 805 may include a processor 840 and memory 830 coupled with or to the processor 840, the processor 840 and memory 830 configured to perform various functions described herein.

The communications manager 820 may support wireless communication at a first device in accordance with examples as disclosed herein. For example, the communications manager 820 may be configured as or otherwise support a means for receiving first control signaling that activates a prediction capability of the first device to generate a set of one or more control parameters for communications. The communications manager 820 may be configured as or otherwise support a means for receiving second control signaling that indicates one or more initial values of the set of one or more control parameters and a channel condition model for the first device. The communications manager 820 may be configured as or otherwise support a means for generating a set of multiple values associated with the set of one or more control parameters over a time period, the generated set of multiple values based on the one or more initial values of the set of one or more control parameters and the channel condition model. The communications manager 820 may be configured as or otherwise support a means for communicating with a second device during at least the time period according to the generated set of multiple values associated with the set of one or more control parameters.

By including or configuring the communications manager 820 in accordance with examples as described herein, the device 805 may support techniques for reduced latency, reduced power consumption, more efficient utilization of communication resources, improved coordination between devices, and longer battery life. The device 805 may generate predicted values of control parameters for a time period based on a channel condition model and a set of one or more initial values of the control parameters, which may reduce an amount of control information that may be exchanged between wireless devices to perform communications. Such techniques may provide for reduced power consumption, reduced control signaling overhead, and improved spectral efficiency. In some examples, the device 805 may transmit or receive one or more DCI messages or other control messages that allocate resources for communications by the device 805. The DCI messages may not include one or more fields for indicating control information, or one or more of the fields in the DCI may be repurposed, which may provide for improved spectral efficiency, reduced latency, and reduced power consumption. The device 805 may thereby be, or support communications with, a reduced capability device or a device in an IoT system.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of prediction-based control information for wireless communication as described herein, or the processor 840 and the memory 830 may be otherwise configured to perform or support such operations.

Figure 9:
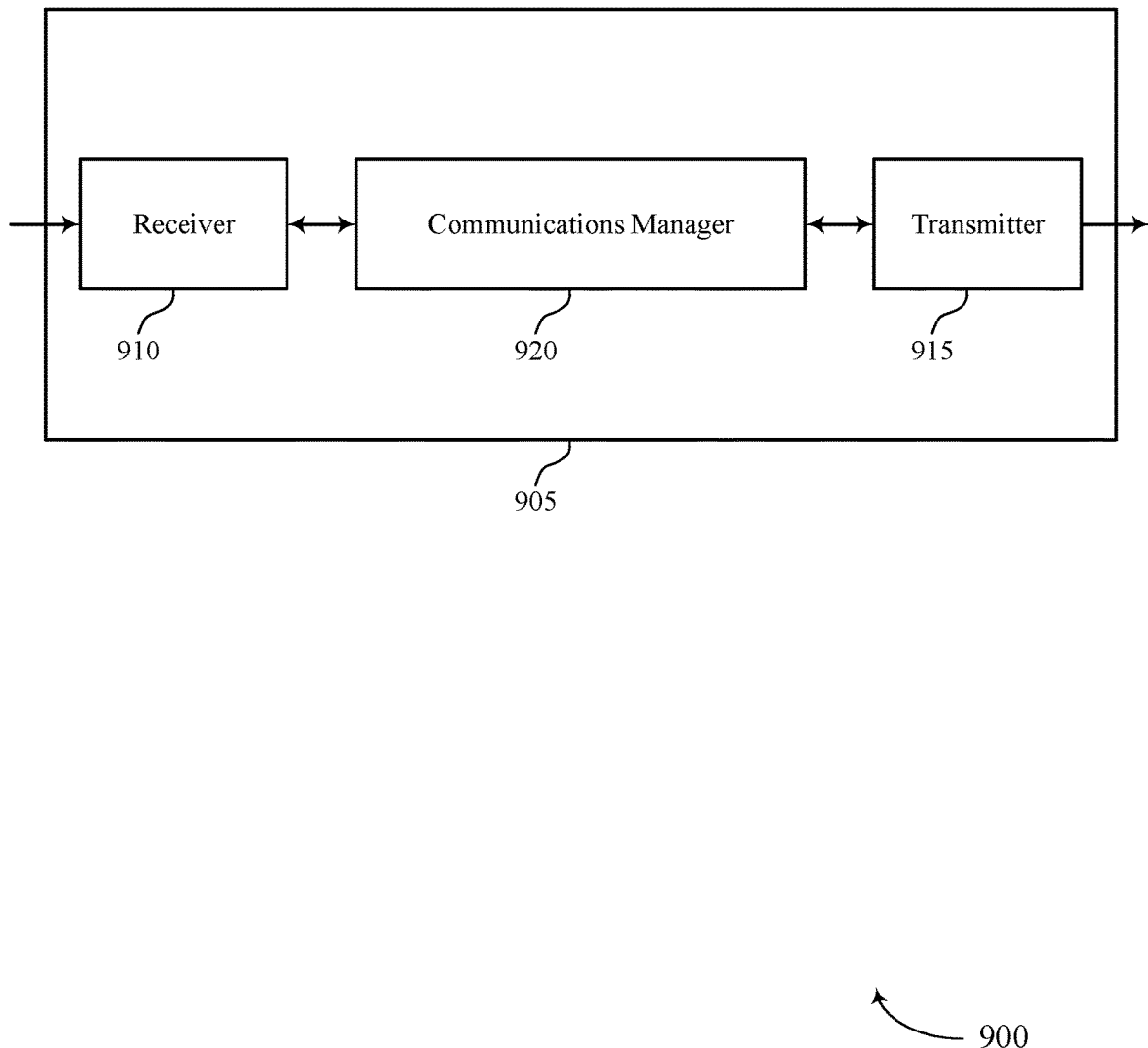
FIGS. 9 and 10 show block diagrams of devices that support prediction-based control information for wireless communication in accordance with one or more aspects of the present disclosure.

FIG. 9 shows a block diagram 900 of a device 905 that supports prediction-based control information for wireless communication in accordance with one or more aspects of the present disclosure. The device 905 may be an example of aspects of a network node as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to prediction-based control information for wireless communication). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to prediction-based control information for wireless communication). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of prediction-based control information for wireless communication as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a second device in accordance with examples as disclosed herein. For example, the communications manager 920 may be configured as or otherwise support a means for transmitting, to a first device, first control signaling that activates a prediction capability of the first device to generate a set of one or more control parameters for communications. The communications manager 920 may be configured as or otherwise support a means for transmitting, to the first device, second control signaling that indicates one or more initial values of the set of one or more control parameters and a channel condition model for the first device. The communications manager 920 may be configured as or otherwise support a means for generating a set of multiple values associated with the set of one or more control parameters over a time period, the generated set of multiple values based on the one or more initial values of the set of one or more control parameters and the channel condition model. The communications manager 920 may be configured as or otherwise support a means for scheduling communications with the first device during at least the time period according to the generated set of multiple values associated with the set of one or more control parameters.

Figure 10:
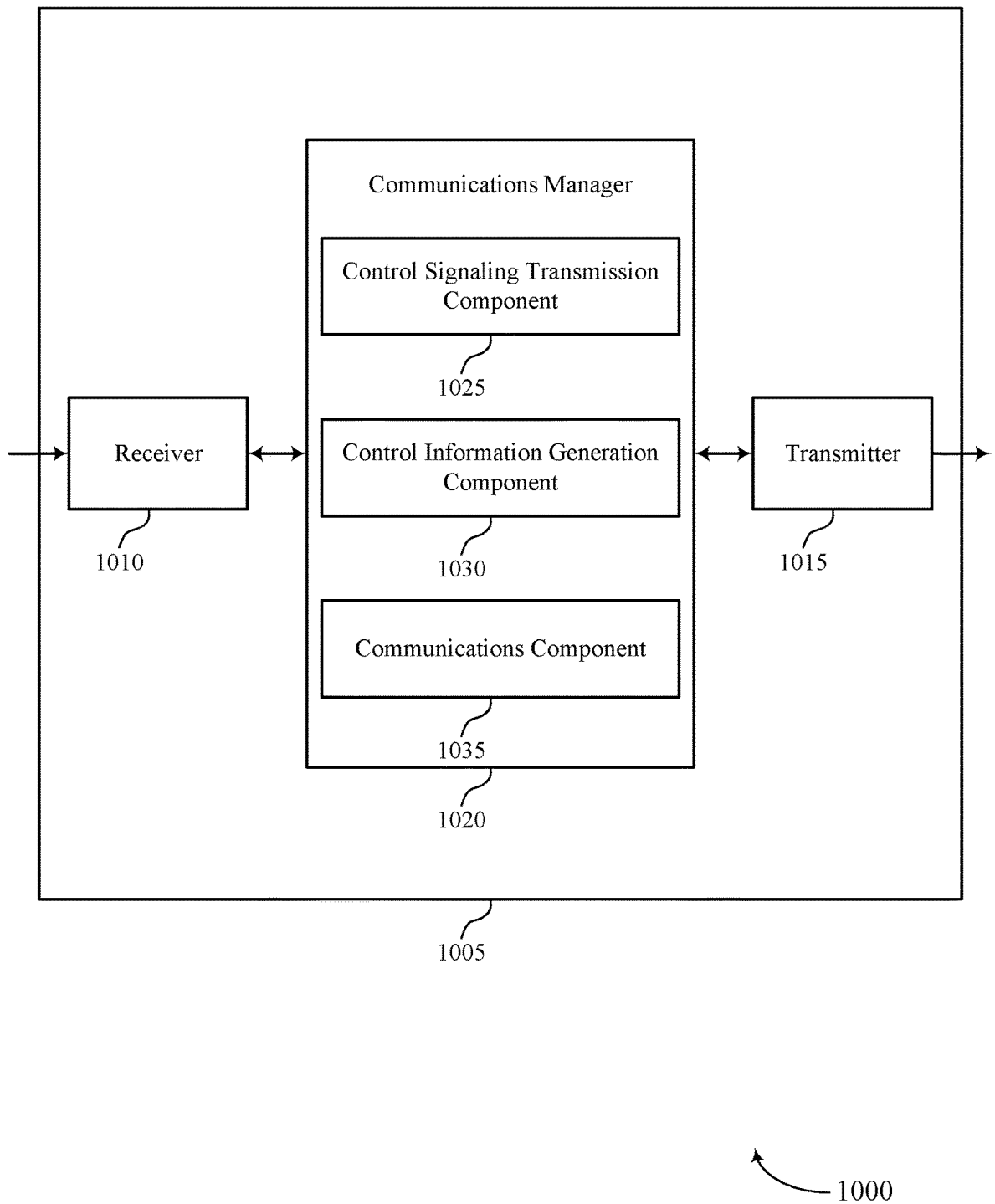

FIG. 10 shows a block diagram 1000 of a device 1005 that supports prediction-based control information for wireless communication in accordance with one or more aspects of the present disclosure. The device 1005 may be an example of aspects of a device 905 or a network node 180 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to prediction-based control information for wireless communication). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to prediction-based control information for wireless communication). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of prediction-based control information for wireless communication as described herein. For example, the communications manager 1020 may include a control signaling transmission component 1025, a control information generation component 1030, a communications component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a second device in accordance with examples as disclosed herein. The control signaling transmission component 1025 may be configured as or otherwise support a means for transmitting, to a first device, first control signaling that activates a prediction capability of the first device. The control signaling transmission component 1025 may be configured as or otherwise support a means for transmitting, to the first device, second control signaling that indicates one or more initial values of a set of one or more control parameters and a channel condition model for the first device. The control information generation component 1030 may be configured as or otherwise support a means for generating a set of multiple values associated with the set of one or more control parameters over a time period, the generated set of multiple values based on the one or more initial values of the set of one or more control parameters and the channel condition model. The communications component 1035 may be configured as or otherwise support a means for scheduling communications with the first device during at least the time period according to the generated set of multiple values associated with the set of one or more control parameters.

Figure 11:
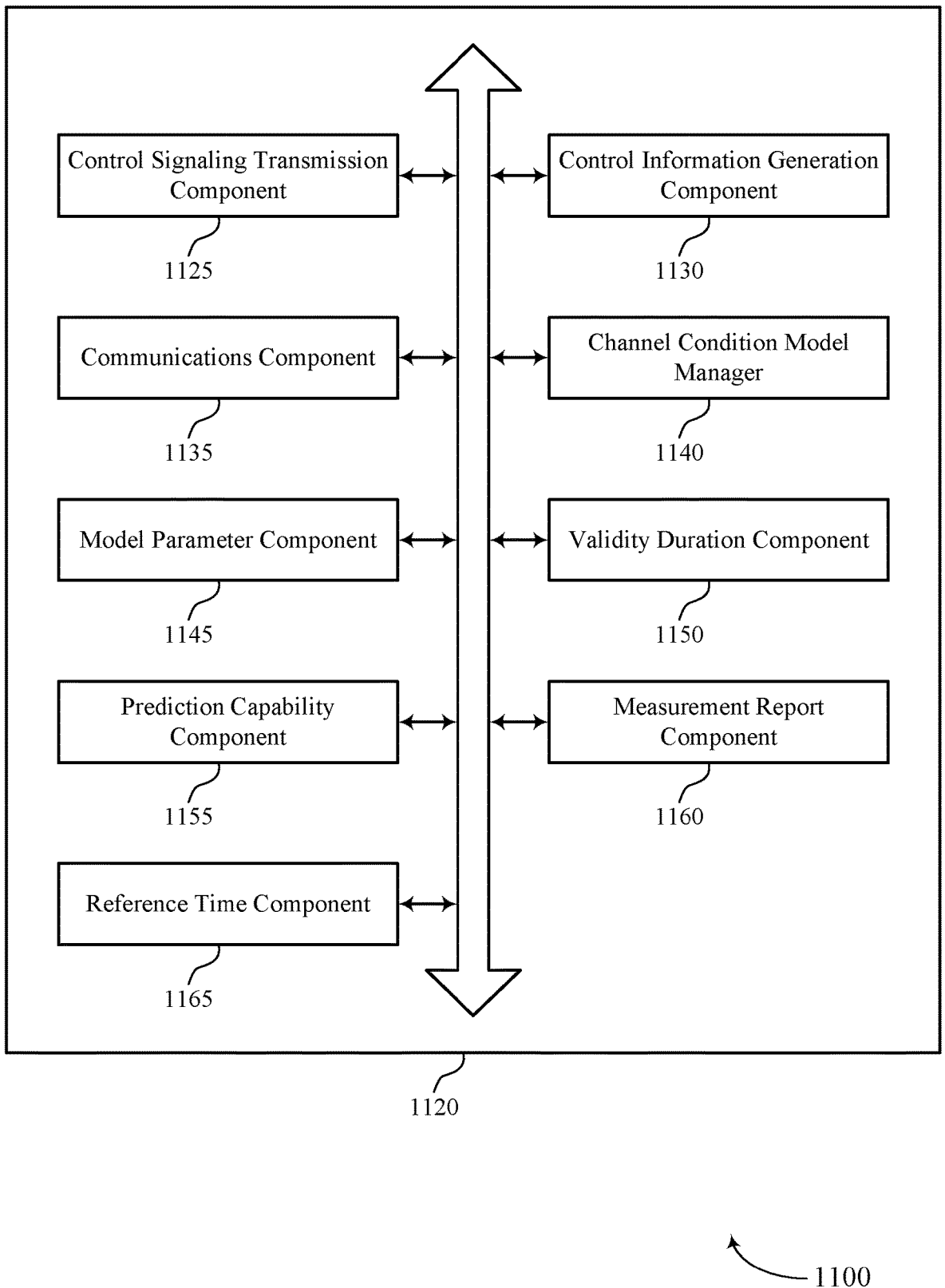
FIG. 11 shows a block diagram of a communications manager that supports prediction-based control information for wireless communication in accordance with one or more aspects of the present disclosure.

FIG. 11 shows a block diagram 1100 of a communications manager 1120 that supports prediction-based control information for wireless communication in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of prediction-based control information for wireless communication as described herein. For example, the communications manager 1120 may include a control signaling transmission component 1125, a control information generation component 1130, a communications component 1135, a channel condition model manager 1140, a model parameter component 1145, a validity duration component 1150, a prediction capability component 1155, a measurement report component 1160, a reference time component 1165, or any combination thereof. Each of these components may communicate, directly or indirectly, with one another (e.g., via one or more buses).

The communications manager 1120 may support wireless communication at a second device in accordance with examples as disclosed herein. The control signaling transmission component 1125 may be configured as or otherwise support a means for transmitting, to a first device, first control signaling that activates a prediction capability of the first device. In some examples, the control signaling transmission component 1125 may be configured as or otherwise support a means for transmitting, to the first device, second control signaling that indicates one or more initial values of a set of one or more control parameters and a channel condition model for the first device. The control information generation component 1130 may be configured as or otherwise support a means for generating a set of multiple values associated with the set of one or more control parameters over a time period, the generated set of multiple values based on the one or more initial values of the set of one or more control parameters and the channel condition model. The communications component 1135 may be configured as or otherwise support a means for scheduling communications with the first device during at least the time period according to the generated set of multiple values associated with the set of one or more control parameters.

In some examples, the channel condition model manager 1140 may be configured as or otherwise support a means for transmitting, via the first control signaling, an indication of a set of multiple channel condition models including at least the channel condition model. In some examples, the channel condition model manager 1140 may be configured as or otherwise support a means for transmitting, via the second control signaling, an indication of an index of the channel condition model from the set of multiple channel condition models. In some examples, the channel condition model manager 1140 may be configured as or otherwise support a means for transmitting the indication of the set of multiple channel condition models to the first device, to a group of one or more devices including the first device, to a set of multiple devices within a same cell, or any combination thereof.

In some examples, to support transmitting the second control signaling, the model parameter component 1145 may be configured as or otherwise support a means for transmitting, via the second control signaling, a set of one or more model parameters associated with the channel condition model, the set of one or more model parameters including a duration of the channel condition model or an amplitude of the channel condition model or both.

In some examples, the model parameter component 1145 may be configured as or otherwise support a means for transmitting, to the first device, a first control message that configures a set of multiple sets of model parameters associated with a set of multiple channel condition models. In some examples, the model parameter component 1145 may be configured as or otherwise support a means for transmitting, via the second control signaling, an indication of the set of one or more model parameters associated with the channel condition model from the set of multiple sets of model parameters configured by the first control message.

In some examples, the control information generation component 1130 may be configured as or otherwise support a means for generating the set of multiple values associated with the set of one or more control parameters over the time period in accordance with the channel condition model and based on a difference between a current time and a reference time associated with the channel condition model. In some examples, the reference time component 1165 may be configured as or otherwise support a means for transmitting, to the first device, a control message that indicates the reference time for the first device.

In some examples, to support transmitting the second control signaling, the control signaling transmission component 1125 may be configured as or otherwise support a means for transmitting a DCI message that indicates the one or more initial values of the set of one or more control parameters and the channel condition model for the first device. In some examples, to support transmitting the second control signaling, the validity duration component 1150 may be configured as or otherwise support a means for starting a timer in response to receiving the DCI message, a duration of the timer based on the time period.

In some examples, the control signaling transmission component 1125 may be configured as or otherwise support a means for transmitting, to the first device and during the time period, one or more DCI messages that indicate resource allocations for the communications between the first device and the second device, each DCI message of the one or more DCI messages including a resource indication field and excluding an MCS field, a TPC field, a TCI field, or any combination thereof based on the prediction capability of the first device.

In some examples, to support transmitting the first control signaling, the prediction capability component 1155 may be configured as or otherwise support a means for transmitting, via the first control signaling, an indication that the prediction capability of the first device is activated for a first HARQ process, activated for a set of multiple HARQ processes, activated per SRI, or any combination thereof. In some examples, the prediction capability component 1155 may be configured as or otherwise support a means for receiving, from the first device, a capability message that indicates the prediction capability of the first device.

In some examples, the measurement report component 1160 may be configured as or otherwise support a means for receiving, from the first device, one or more measurement report messages including an indication of CSI associated with a channel between the first device and the second device, position information associated with the first device, or both, the channel condition model based on the one or more measurement reports.

Figure 12:
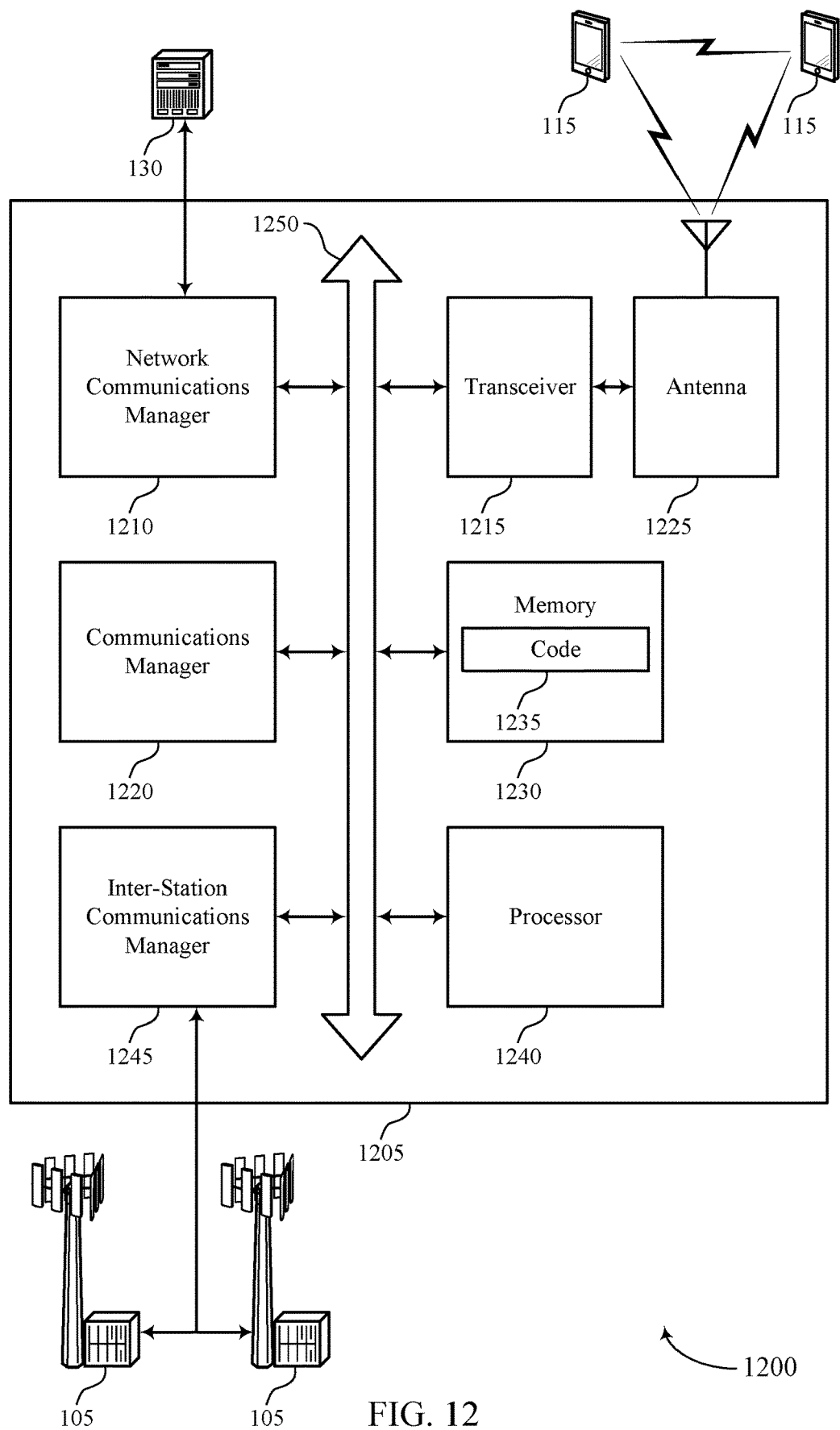
FIG. 12 shows a diagram of a system including a device that supports prediction-based control information for wireless communication in accordance with one or more aspects of the present disclosure.

FIG. 12 shows a diagram of a system 1200 including a device 1205 that supports prediction-based control information for wireless communication in accordance with one or more aspects of the present disclosure. The device 1205 may be an example of or include the components of a device 905, a device 1005, or a network node as described herein. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting prediction-based control information for wireless communication). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a second device in accordance with examples as disclosed herein. For example, the communications manager 1220 may be configured as or otherwise support a means for transmitting, to a first device, first control signaling that activates a prediction capability of the first device. The communications manager 1220 may be configured as or otherwise support a means for transmitting, to the first device, second control signaling that indicates one or more initial values of a set of one or more control parameters and a channel condition model for the first device. The communications manager 1220 may be configured as or otherwise support a means for generating a set of multiple values associated with the set of one or more control parameters over a time period, the generated set of multiple values based on the one or more initial values of the set of one or more control parameters and the channel condition model. The communications manager 1220 may be configured as or otherwise support a means for scheduling communications with the first device during at least the time period according to the generated set of multiple values associated with the set of one or more control parameters.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of prediction-based control information for wireless communication as described herein, or the processor 1240 and the memory 1230 may be otherwise configured to perform or support such operations.

Figure 13:
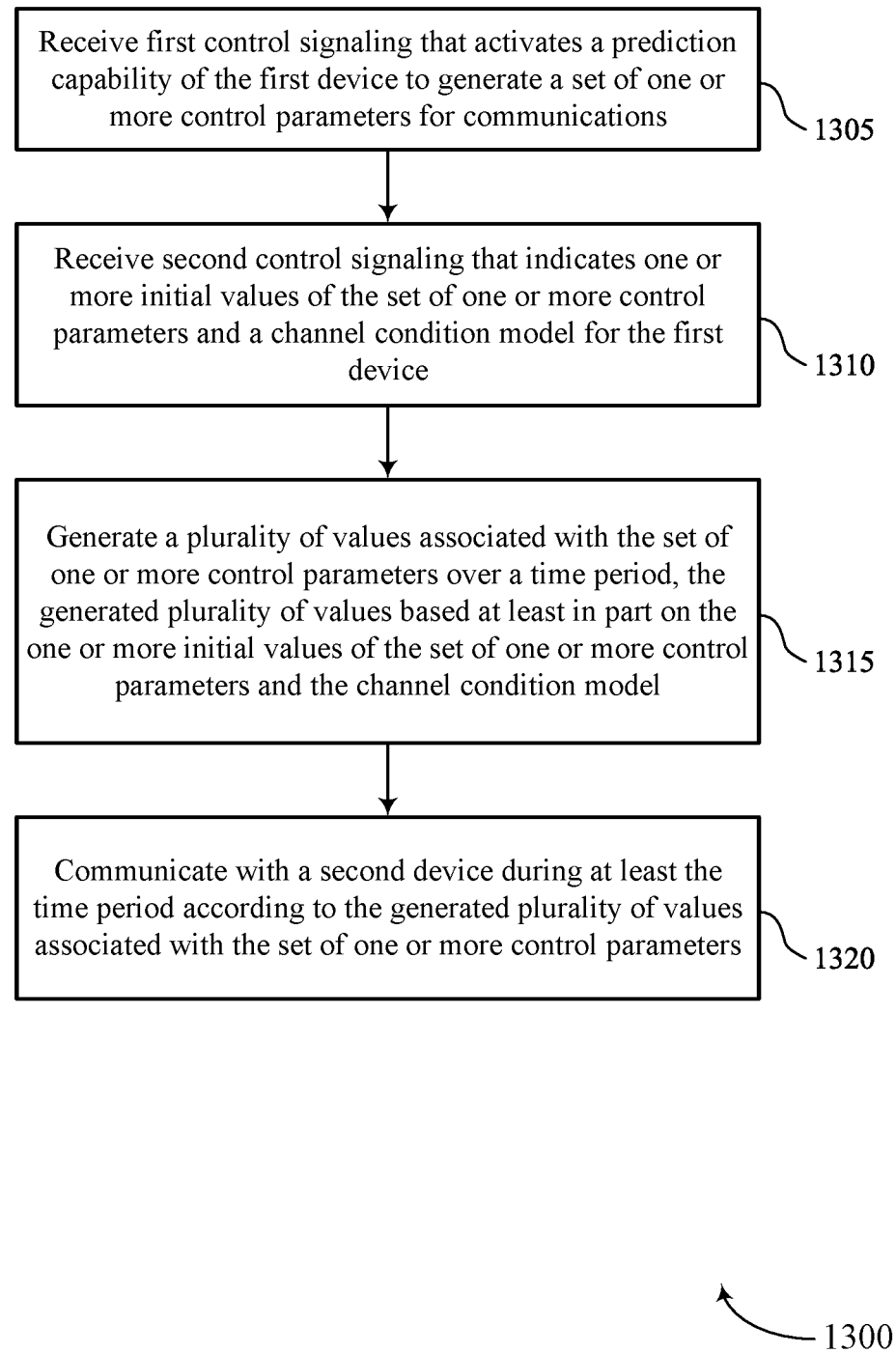
FIGS. 13 through 19 show flowcharts illustrating methods that support prediction-based control information for wireless communication in accordance with one or more aspects of the present disclosure.

FIG. 13 shows a flowchart illustrating a method 1300 that supports prediction-based control information for wireless communication in accordance with one or more aspects of the present disclosure. The operations of the method 1300 may be implemented by a first device (e.g., a UE) or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving first control signaling that activates a prediction capability of the first device to generate a set of one or more control parameters for communications. The operations of 1305 may be performed in accordance with examples as disclosed herein. In some examples, aspects of the operations of 1305 may be performed by a control signaling reception component 725 as described with reference to FIG. 7.

At 1310, the method may include receiving second control signaling that indicates one or more initial values of the set of one or more control parameters and a channel condition model for the first device. The operations of 1310 may be performed in accordance with examples as disclosed herein. In some examples, aspects of the operations of 1310 may be performed by a control signaling reception component 725 as described with reference to FIG. 7.

At 1315, the method may include generating a set of multiple values associated with the set of one or more control parameters over a time period, the generated set of multiple values based on the one or more initial values of the set of one or more control parameters and the channel condition model. The operations of 1315 may be performed in accordance with examples as disclosed herein. In some examples, aspects of the operations of 1315 may be performed by a control information generation component 730 as described with reference to FIG. 7.

At 1320, the method may include communicating with a second device during at least the time period according to the generated set of multiple values associated with the set of one or more control parameters. The operations of 1320 may be performed in accordance with examples as disclosed herein. In some examples, aspects of the operations of 1320 may be performed by a communication component 735 as described with reference to FIG. 7.

Figure 14:
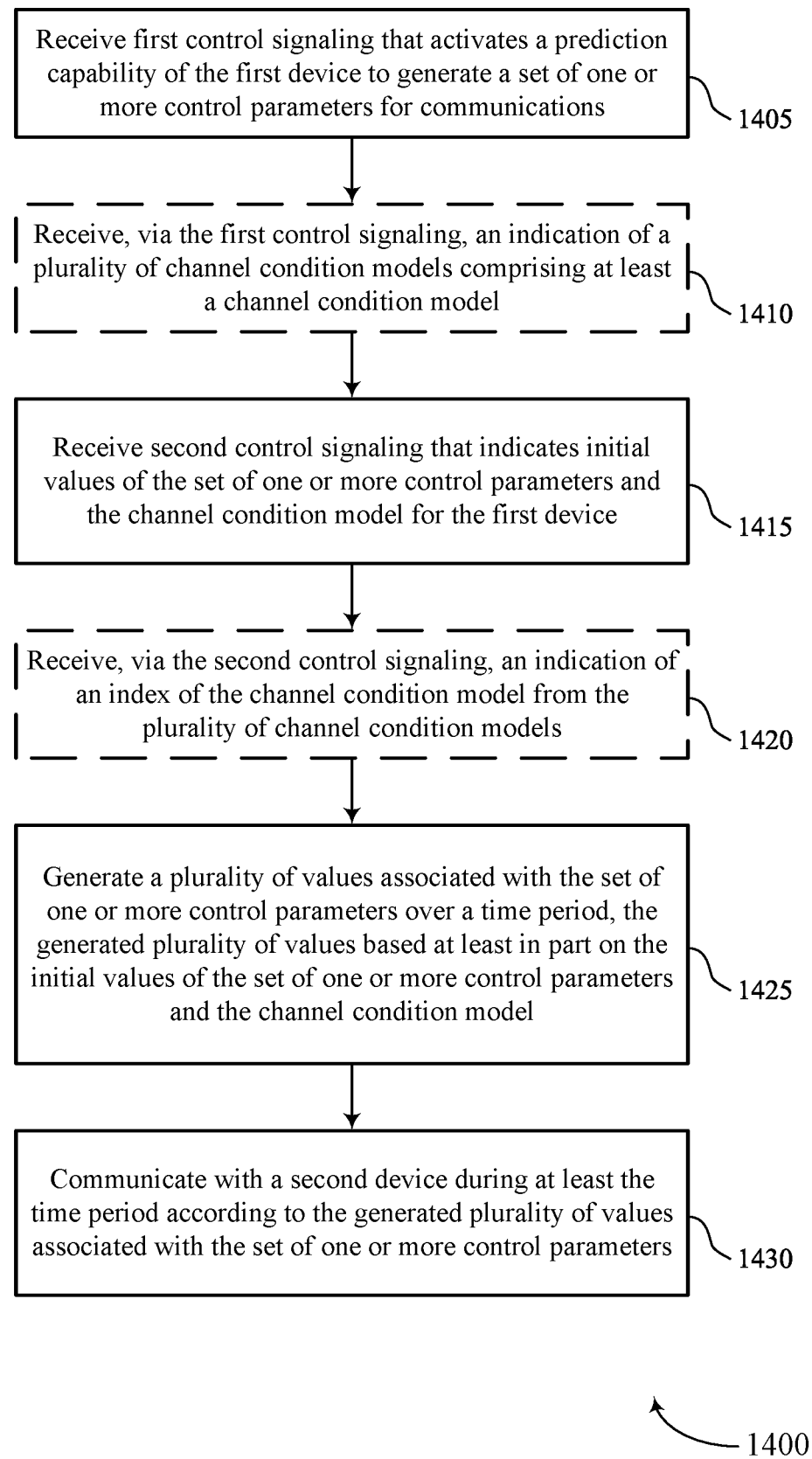

FIG. 14 shows a flowchart illustrating a method 1400 that supports prediction-based control information for wireless communication in accordance with one or more aspects of the present disclosure. The operations of the method 1400 may be implemented by a first device (e.g., a UE) or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving first control signaling that activates a prediction capability of the first device to generate a set of one or more control parameters for communications. The operations of 1405 may be performed in accordance with examples as disclosed herein. In some examples, aspects of the operations of 1405 may be performed by a control signaling reception component 725 as described with reference to FIG. 7.

At 1410, in some examples, the method may include receiving, via the first control signaling, an indication of a set of multiple channel condition models including at least a channel condition model. The operations of 1410 may be performed in accordance with examples as disclosed herein. In some examples, aspects of the operations of 1410 may be performed by a channel condition model manager 740 as described with reference to FIG. 7.

At 1415, the method may include receiving second control signaling that indicates one or more initial values of the set of one or more control parameters and the channel condition model for the first device. The operations of 1415 may be performed in accordance with examples as disclosed herein. In some examples, aspects of the operations of 1415 may be performed by a control signaling reception component 725 as described with reference to FIG. 7.

At 1420, in some examples, the method may include receiving, via the second control signaling, an indication of an index of the channel condition model from the set of multiple channel condition models. The operations of 1420 may be performed in accordance with examples as disclosed herein. In some examples, aspects of the operations of 1420 may be performed by a channel condition model manager 740 as described with reference to FIG. 7.

At 1425, the method may include generating a set of multiple values associated with the set of one or more control parameters over a time period, the generated set of multiple values based on the one or more initial values of the set of one or more control parameters and the channel condition model. The operations of 1425 may be performed in accordance with examples as disclosed herein. In some examples, aspects of the operations of 1425 may be performed by a control information generation component 730 as described with reference to FIG. 7.

At 1430, the method may include communicating with a second device during at least the time period according to the generated set of multiple values associated with the set of one or more control parameters. The operations of 1430 may be performed in accordance with examples as disclosed herein. In some examples, aspects of the operations of 1430 may be performed by a communication component 735 as described with reference to FIG. 7.

Figure 15:
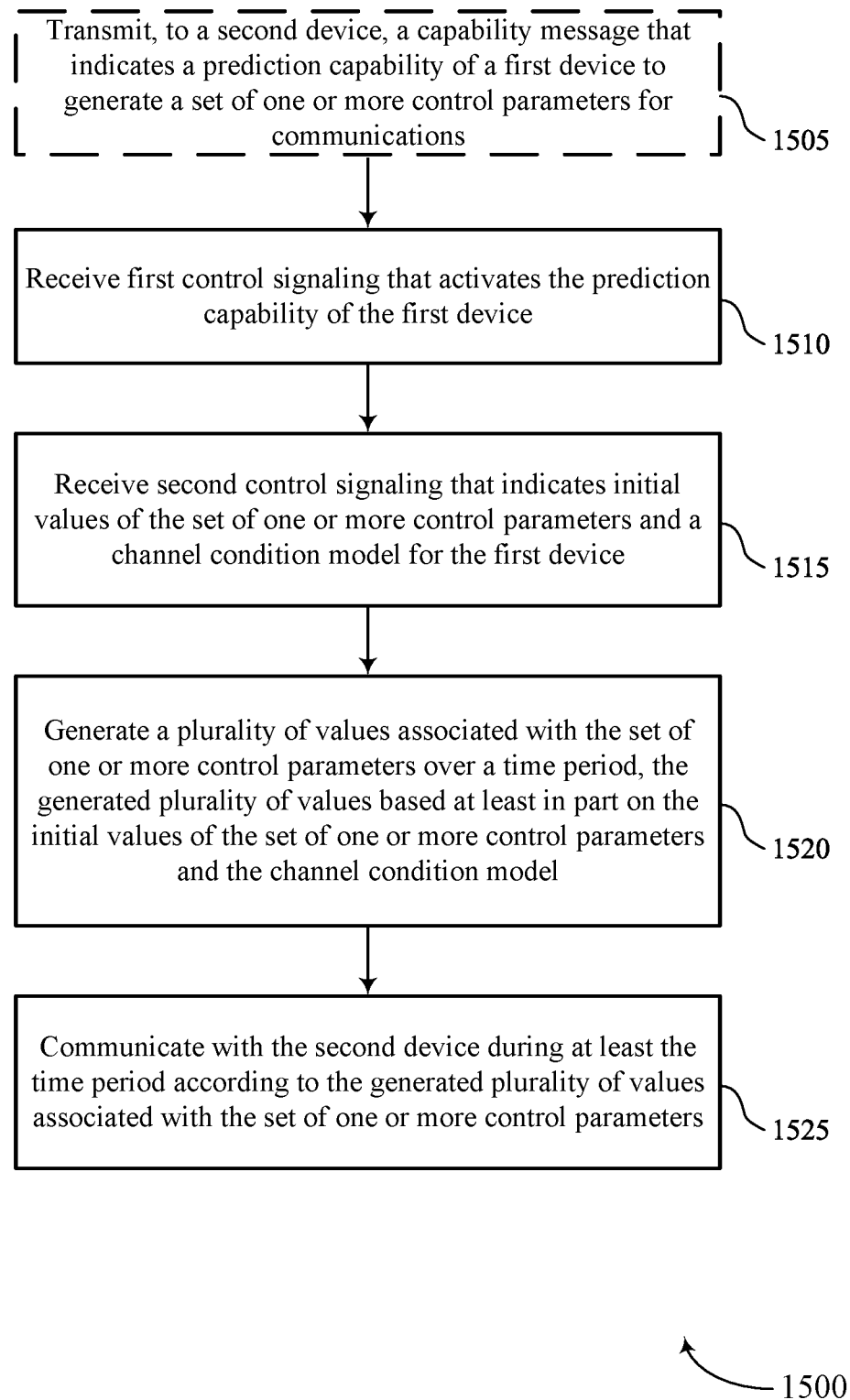

FIG. 15 shows a flowchart illustrating a method 1500 that supports prediction-based control information for wireless communication in accordance with one or more aspects of the present disclosure. The operations of the method 1500 may be implemented by a first device (e.g., a UE) or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, in some examples, the method may include transmitting, to a second device, a capability message that indicates a prediction capability of the first device to generate a set of one or more control parameters for communications. The operations of 1505 may be performed in accordance with examples as disclosed herein. In some examples, aspects of the operations of 1505 may be performed by a prediction capability component 760 as described with reference to FIG. 7.

At 1510, the method may include receiving first control signaling that activates the prediction capability of the first device. The operations of 1510 may be performed in accordance with examples as disclosed herein. In some examples, aspects of the operations of 1510 may be performed by a control signaling reception component 725 as described with reference to FIG. 7.

At 1515, the method may include receiving second control signaling that indicates one or more initial values of the set of one or more control parameters and a channel condition model for the first device. The operations of 1515 may be performed in accordance with examples as disclosed herein. In some examples, aspects of the operations of 1515 may be performed by a control signaling reception component 725 as described with reference to FIG. 7.

At 1520, the method may include generating a set of multiple values associated with the set of one or more control parameters over a time period, the generated set of multiple values based on the one or more initial values of the set of one or more control parameters and the channel condition model. The operations of 1520 may be performed in accordance with examples as disclosed herein. In some examples, aspects of the operations of 1520 may be performed by a control information generation component 730 as described with reference to FIG. 7.

At 1525, the method may include communicating with the second device during at least the time period according to the generated set of multiple values associated with the set of one or more control parameters. The operations of 1525 may be performed in accordance with examples as disclosed herein. In some examples, aspects of the operations of 1525 may be performed by a communication component 735 as described with reference to FIG. 7.

Figure 16:
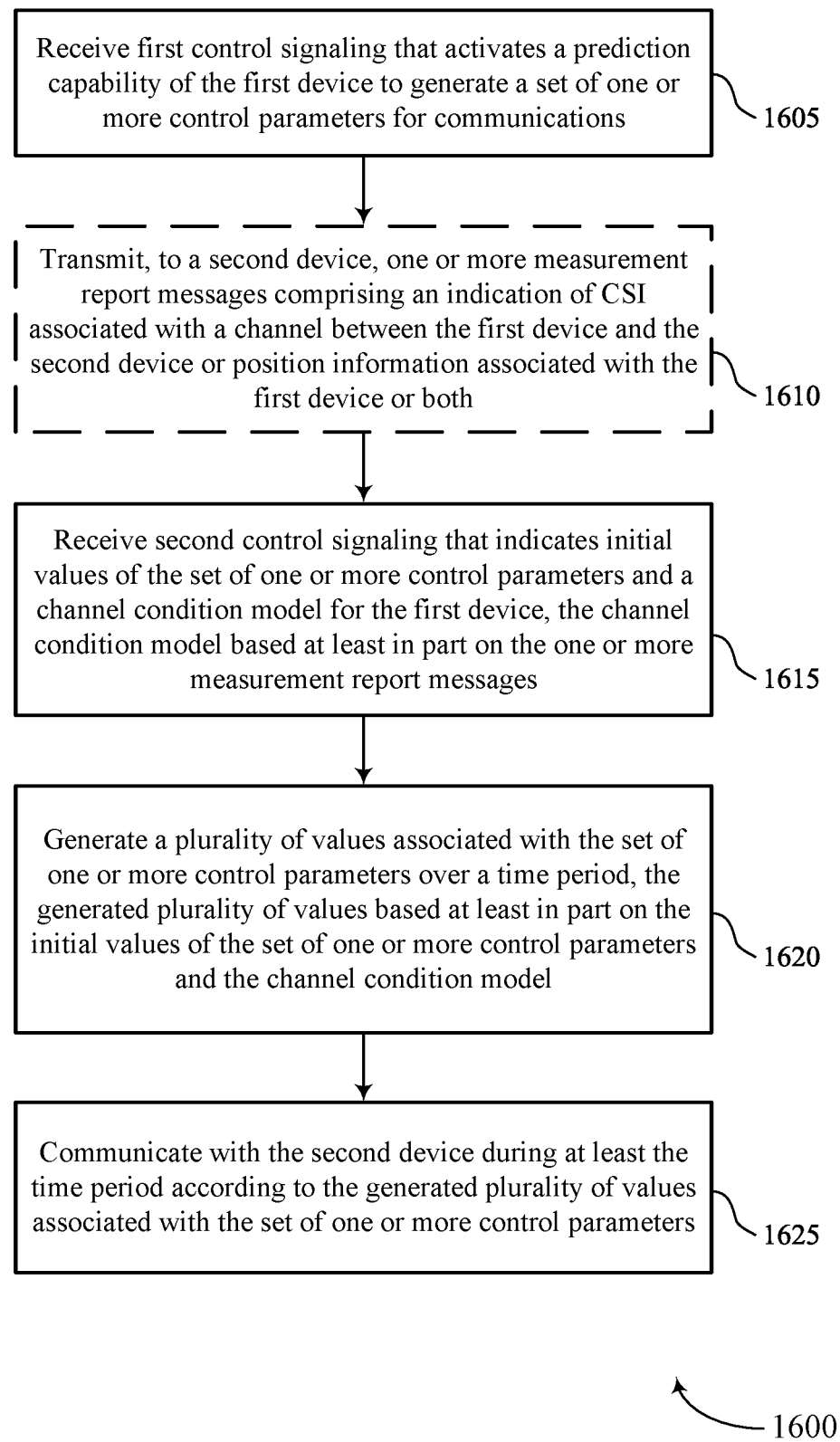

FIG. 16 shows a flowchart illustrating a method 1600 that supports prediction-based control information for wireless communication in accordance with one or more aspects of the present disclosure. The operations of the method 1600 may be implemented by a first device (e.g., a UE) or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving first control signaling that activates a prediction capability of the first device. The operations of 1605 may be performed in accordance with examples as disclosed herein. In some examples, aspects of the operations of 1605 may be performed by a control signaling reception component 725 as described with reference to FIG. 7.

At 1610, in some examples, the method may include transmitting, to a second device, one or more measurement report messages including an indication of CSI associated with a channel between the first device and the second device or position information associated with the first device or both. The operations of 1610 may be performed in accordance with examples as disclosed herein. In some examples, aspects of the operations of 1610 may be performed by a measurement report component 765 as described with reference to FIG. 7.

At 1615, the method may include receiving second control signaling that indicates one or more initial values of a set of one or more control parameters and a channel condition model for the first device, the channel condition model based on the one or more measurement report messages. The operations of 1615 may be performed in accordance with examples as disclosed herein. In some examples, aspects of the operations of 1615 may be performed by a control signaling reception component 725 as described with reference to FIG. 7.

At 1620, the method may include generating a set of multiple values associated with the set of one or more control parameters over a time period, the generated set of multiple values based on the one or more initial values of the set of one or more control parameters and the channel condition model. The operations of 1620 may be performed in accordance with examples as disclosed herein. In some examples, aspects of the operations of 1620 may be performed by a control information generation component 730 as described with reference to FIG. 7.

At 1625, the method may include communicating with the second device during at least the time period according to the generated set of multiple values associated with the set of one or more control parameters. The operations of 1625 may be performed in accordance with examples as disclosed herein. In some examples, aspects of the operations of 1625 may be performed by a communication component 735 as described with reference to FIG. 7.

Figure 17:
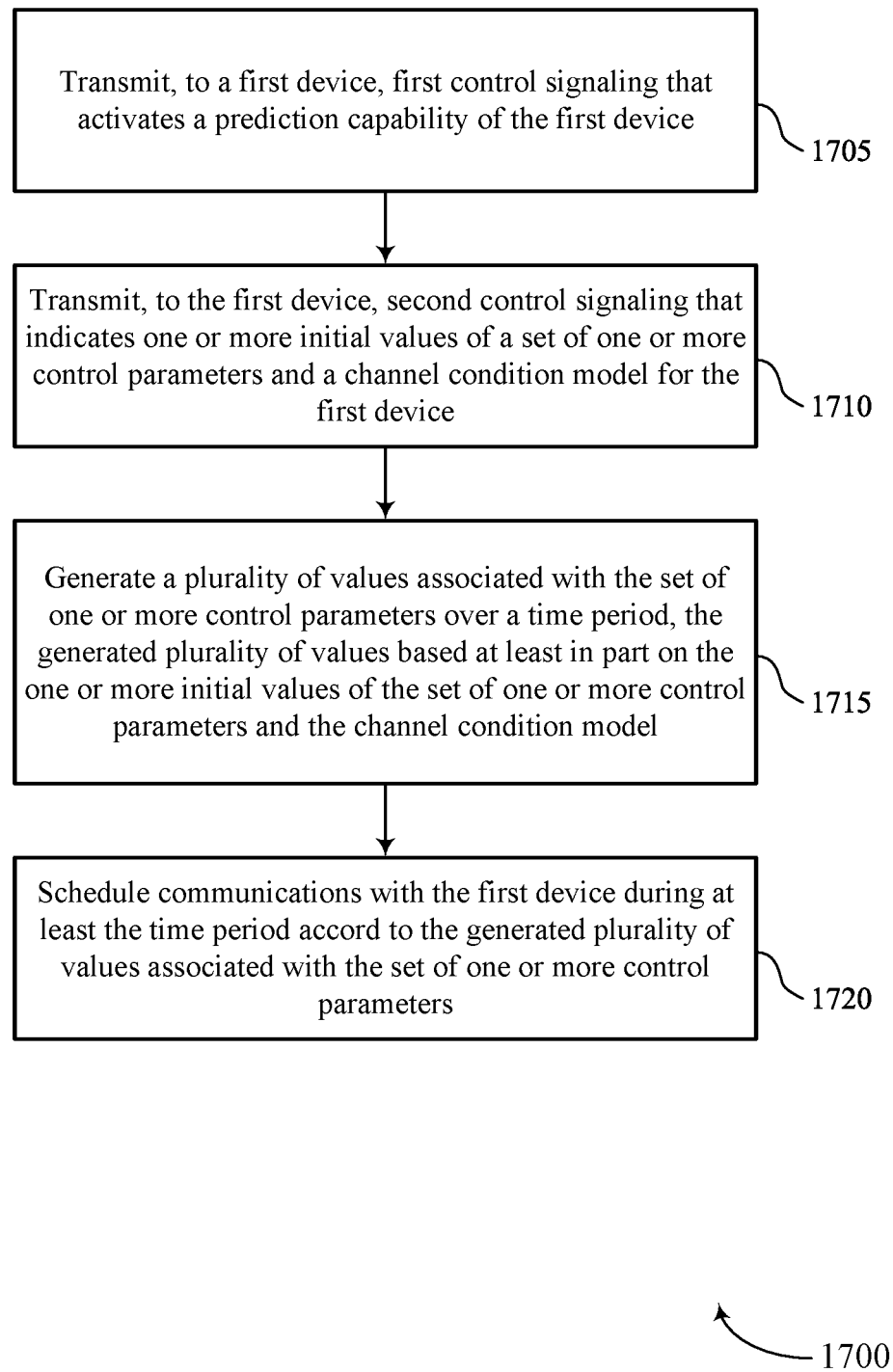

FIG. 17 shows a flowchart illustrating a method 1700 that supports prediction-based control information for wireless communication in accordance with one or more aspects of the present disclosure. The operations of the method 1700 may be implemented by a second device (e.g., a network node) or its components as described herein. For example, the operations of the method 1700 may be performed by a network node as described with reference to FIGS. 1 through 4 and 9 through 12. In some examples, a network node may execute a set of instructions to control the functional elements of the network node to perform the described functions. Additionally or alternatively, the network node may perform aspects of the described functions using special-purpose hardware.

At 1705, the method may include transmitting, to a first device, first control signaling that activates a prediction capability of the first device. The operations of 1705 may be performed in accordance with examples as disclosed herein. In some examples, aspects of the operations of 1705 may be performed by a control signaling transmission component 1125 as described with reference to FIG. 11.

At 1710, the method may include transmitting, to the first device, second control signaling that indicates one or more initial values of a set of one or more control parameters and a channel condition model for the first device. The operations of 1710 may be performed in accordance with examples as disclosed herein. In some examples, aspects of the operations of 1710 may be performed by a control signaling transmission component 1125 as described with reference to FIG. 11.

At 1715, the method may include generating a set of multiple values associated with the set of one or more control parameters over a time period, the generated set of multiple values based on the one or more initial values of the set of one or more control parameters and the channel condition model. The operations of 1715 may be performed in accordance with examples as disclosed herein. In some examples, aspects of the operations of 1715 may be performed by a control information generation component 1130 as described with reference to FIG. 11.

At 1720, the method may include scheduling communications with the first device during at least the time period according to the generated set of multiple values associated with the set of one or more control parameters. The operations of 1720 may be performed in accordance with examples as disclosed herein. In some examples, aspects of the operations of 1720 may be performed by a communications component 1135 as described with reference to FIG. 11.

Figure 18:
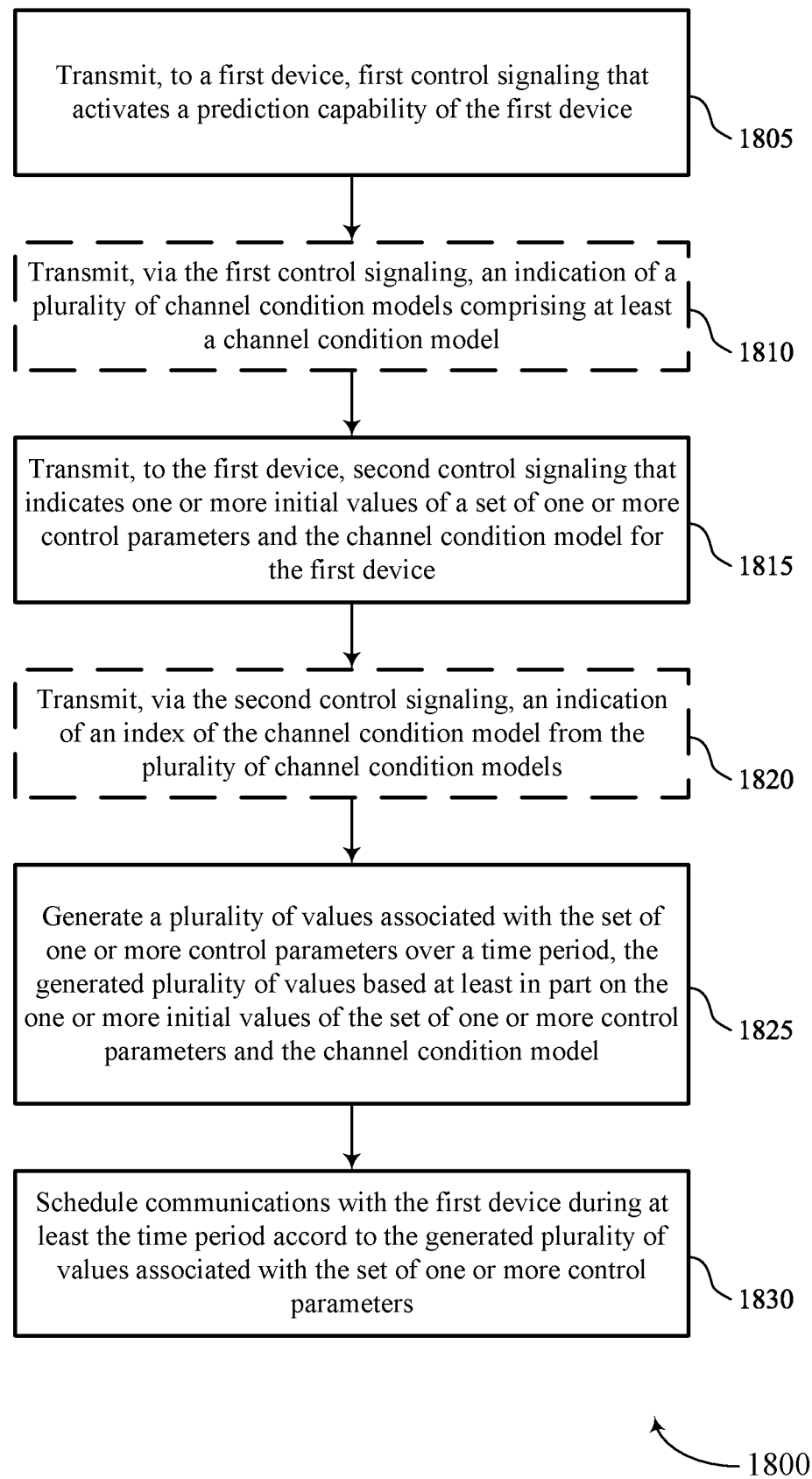

FIG. 18 shows a flowchart illustrating a method 1800 that supports prediction-based control information for wireless communication in accordance with one or more aspects of the present disclosure. The operations of the method 1800 may be implemented by a second device (e.g., a network node) or its components as described herein. For example, the operations of the method 1800 may be performed by a network node as described with reference to FIGS. 1 through 4 and 9 through 12. In some examples, a network node may execute a set of instructions to control the functional elements of the network node to perform the described functions. Additionally or alternatively, the network node may perform aspects of the described functions using special-purpose hardware.

At 1805, the method may include transmitting, to a first device, first control signaling that activates a prediction capability of the first device. The operations of 1805 may be performed in accordance with examples as disclosed herein. In some examples, aspects of the operations of 1805 may be performed by a control signaling transmission component 1125 as described with reference to FIG. 11.

At 1810, in some examples, the method may include transmitting, via the first control signaling, an indication of a set of multiple channel condition models including at least a channel condition model. The operations of 1810 may be performed in accordance with examples as disclosed herein. In some examples, aspects of the operations of 1810 may be performed by a channel condition model manager 1140 as described with reference to FIG. 11.

At 1815, the method may include transmitting, to the first device, second control signaling that indicates one or more initial values of a set of one or more control parameters and the channel condition model for the first device. The operations of 1815 may be performed in accordance with examples as disclosed herein. In some examples, aspects of the operations of 1815 may be performed by a control signaling transmission component 1125 as described with reference to FIG. 11.

At 1820, in some examples, the method may include transmitting, via the second control signaling, an indication of an index of the channel condition model from the set of multiple channel condition models. The operations of 1820 may be performed in accordance with examples as disclosed herein. In some examples, aspects of the operations of 1820 may be performed by a channel condition model manager 1140 as described with reference to FIG. 11.

At 1825, the method may include generating a set of multiple values associated with the set of one or more control parameters over a time period, the generated set of multiple values based on the one or more initial values of the set of one or more control parameters and the channel condition model. The operations of 1825 may be performed in accordance with examples as disclosed herein. In some examples, aspects of the operations of 1825 may be performed by a control information generation component 1130 as described with reference to FIG. 11.

At 1830, the method may include scheduling communications with the first device during at least the time period according to the generated set of multiple values associated with the set of one or more control parameters. The operations of 1830 may be performed in accordance with examples as disclosed herein. In some examples, aspects of the operations of 1830 may be performed by a communications component 1135 as described with reference to FIG. 11.

Figure 19:
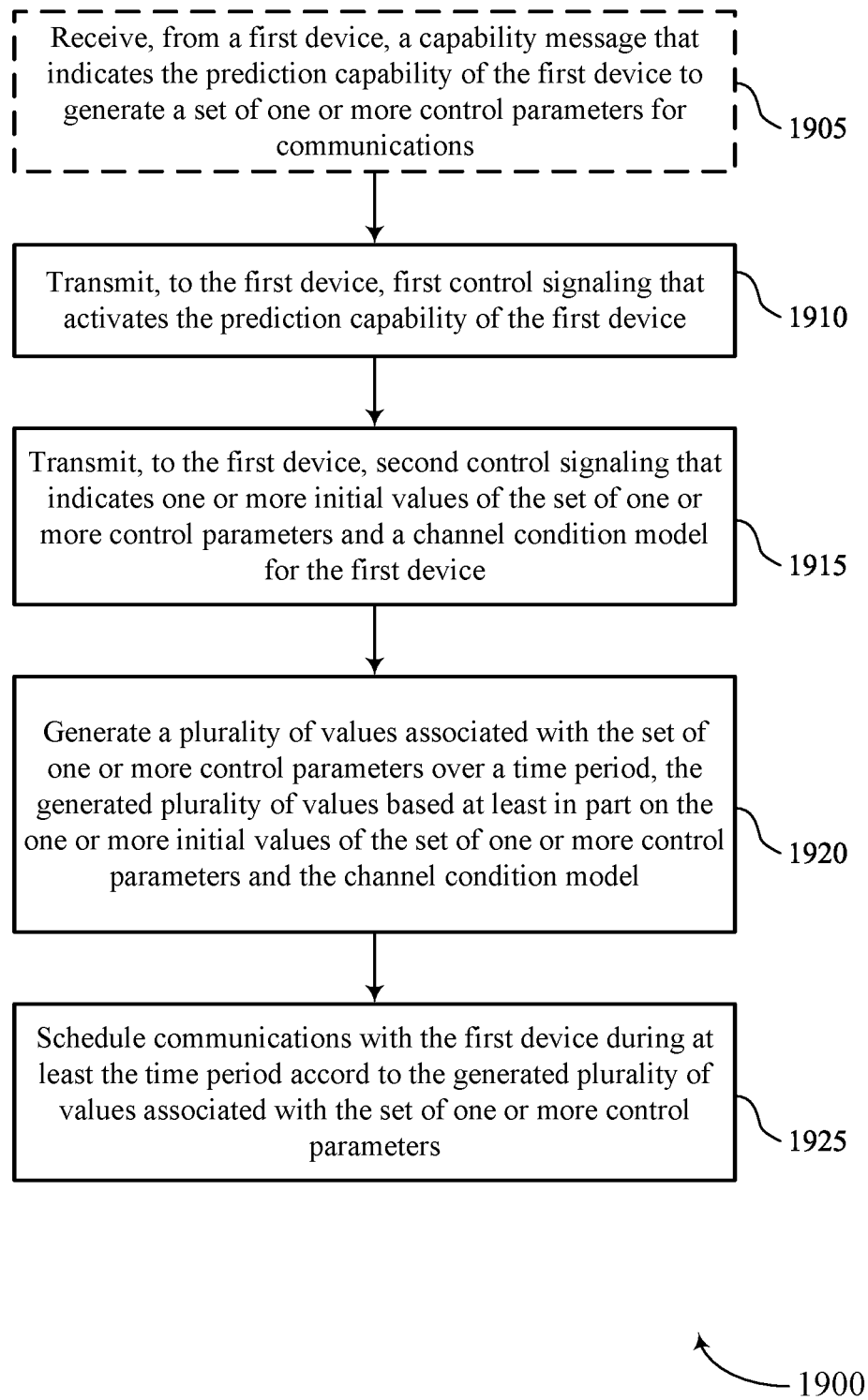

FIG. 19 shows a flowchart illustrating a method 1900 that supports prediction-based control information for wireless communication in accordance with one or more aspects of the present disclosure. The operations of the method 1900 may be implemented by a second device (e.g., a network node) or its components as described herein. For example, the operations of the method 1900 may be performed by a network node as described with reference to FIGS. 1 through 4 and 9 through 12. In some examples, a network node may execute a set of instructions to control the functional elements of the network node to perform the described functions. Additionally or alternatively, the network node may perform aspects of the described functions using special-purpose hardware.

At 1905, in some examples, the method may include receiving, from a first device, a capability message that indicates a prediction capability of the first device to generate a set of one or more control parameters for communications. The operations of 1905 may be performed in accordance with examples as disclosed herein. In some examples, aspects of the operations of 1905 may be performed by a prediction capability component 1155 as described with reference to FIG. 11.

At 1910, the method may include transmitting, to the first device, first control signaling that activates the prediction capability of the first device. The operations of 1910 may be performed in accordance with examples as disclosed herein. In some examples, aspects of the operations of 1910 may be performed by a control signaling transmission component 1125 as described with reference to FIG. 11.

At 1915, the method may include transmitting, to the first device, second control signaling that indicates one or more initial values of the set of one or more control parameters and a channel condition model for the first device. The operations of 1915 may be performed in accordance with examples as disclosed herein. In some examples, aspects of the operations of 1915 may be performed by a control signaling transmission component 1125 as described with reference to FIG. 11.

At 1920, the method may include generating a set of multiple values associated with the set of one or more control parameters over a time period, the generated set of multiple values based on the one or more initial values of the set of one or more control parameters and the channel condition model. The operations of 1920 may be performed in accordance with examples as disclosed herein. In some examples, aspects of the operations of 1920 may be performed by a control information generation component 1130 as described with reference to FIG. 11.

At 1925, the method may include scheduling communications with the first device during at least the time period according to the generated set of multiple values associated with the set of one or more control parameters. The operations of 1925 may be performed in accordance with examples as disclosed herein. In some examples, aspects of the operations of 1925 may be performed by a communications component 1135 as described with reference to FIG. 11.

The following provides an overview of aspects of the present disclosure:

Aspect 1: A method for wireless communication at a first device, comprising: receiving first control signaling that activates a prediction capability of the first device to generate a set of one or more control parameters for communications; receiving second control signaling that indicates one or more initial values of the set of one or more control parameters and a channel condition model for the first device; generating a plurality of values associated with the set of one or more control parameters over a time period, the generated plurality of values based at least in part on the one or more initial values of the set of one or more control parameters and the channel condition model; and communicating with a second device during at least the time period according to the generated plurality of values associated with the set of one or more control parameters.

Aspect 2: The method of aspect 1, wherein receiving the first control signaling comprises: receiving, via the first control signaling, an indication of a plurality of channel condition models comprising at least the channel condition model.

Aspect 3: The method of aspect 2, wherein receiving the second control signaling comprises: receiving, via the second control signaling, an indication of an index of the channel condition model from the plurality of channel condition models.

Aspect 4: The method of aspect 2, wherein receiving the second control signaling comprises: receiving a first control message that indicates a subset of indices of a subset of channel condition models from the plurality of channel condition models; and receiving a second control message that indicates an index of the channel condition model for the first device from the subset of indices.

Aspect 5: The method of any of aspects 2 through 4, wherein the first control signaling indicates a respective type or a respective set of parameters or both associated with each channel condition model of the plurality of channel condition models, the respective type corresponding to a normalized function indicative of a state of a channel between the first device and the second device, and the respective set of parameters comprising an amplitude or a duration or both of the normalized function.

Aspect 6: The method of any of aspects 1 through 5, wherein receiving the second control signaling comprises: receiving, via the second control signaling, a set of one or more model parameters associated with the channel condition model, the set of one or more model parameters comprising a duration of the channel condition model, an amplitude of the channel condition model, or both.

Aspect 7: The method of aspect 6, further comprising: receiving a first control message that configures a plurality of sets of model parameters associated with a plurality of channel condition models; and receiving, via the second control signaling, an indication of the set of one or more model parameters associated with the channel condition model from the plurality of sets of model parameters configured by the first control message.

Aspect 8: The method of any of aspects 1 through 7, wherein generating the plurality of values associated with the set of one or more control parameters comprises: generating the plurality of values associated with the set of one or more control parameters over the time period in accordance with the channel condition model and based at least in part on a difference between a current time and a reference time associated with the channel condition model.

Aspect 9: The method of aspect 8, further comprising: receiving a control message that indicates the reference time for the first device.

Aspect 10: The method of any of aspects 1 through 9, wherein receiving the second control signaling comprises: receiving a DCI message that indicates the one or more initial values of the set of one or more control parameters and the channel condition model for the first device; and starting a timer in response to receiving the DCI message, a duration of the timer based at least in part on the time period.

Aspect 11: The method of any of aspects 1 through 10, further comprising: receiving a control message that indicates the time period for the first device.

Aspect 12: The method of any of aspects 1 through 11, further comprising: receiving, during the time period, one or more DCI messages that indicate resource allocations for the communications between the first device and the second device, each DCI message of the one or more DCI messages comprising a resource indication field and excluding an MCS field, a TPC field, a TCI field, or any combination thereof based at least in part on the prediction capability of the first device.

Aspect 13: The method of any of aspects 1 through 12, wherein receiving the first control signaling comprises: receiving, via the first control signaling, an indication that the prediction capability of the first device is activated for a first HARQ process, activated for a plurality of HARQ processes, activated per SRI, or any combination thereof.

Aspect 14: The method of any of aspects 1 through 13, further comprising: transmitting, to the second device, a capability message that indicates the prediction capability of the first device.

Aspect 15: The method of any of aspects 1 through 14, further comprising: transmitting, to the second device, one or more measurement report messages comprising an indication of CSI associated with a channel between the first device and the second device or position information associated with the first device or both, the channel condition model based at least in part on the one or more measurement report messages.

Aspect 16: The method of any of aspects 1 through 15, wherein the set of one or more control parameters comprises MCS parameters, beam parameters, uplink power control parameters, or any combination thereof.

Aspect 17: The method of any of aspects 1 through 16, wherein the first control signaling comprises RRC signaling; and the second control signaling comprises second RRC signaling, a MAC-CE, DCI, a downlink control channel message, or any combination thereof.

Aspect 18: A method for wireless communication at a second device, comprising: transmitting, to a first device, first control signaling that activates a prediction capability of the first device to generate a set of one or more control parameters for communications; transmitting, to the first device, second control signaling that indicates one or more initial values of the set of one or more control parameters and a channel condition model for the first device; generating a plurality of values associated with the set of one or more control parameters over a time period, the generated plurality of values based at least in part on the one or more initial values of the set of one or more control parameters and the channel condition model; and scheduling communications with the first device during at least the time period according to the generated plurality of values associated with the set of one or more control parameters.

Aspect 19: The method of aspect 18, further comprising: transmitting, via the first control signaling, an indication of a plurality of channel condition models comprising at least the channel condition model; and transmitting, via the second control signaling, an indication of an index of the channel condition model from the plurality of channel condition models.

Aspect 20: The method of aspect 19, further comprising: transmitting the indication of the plurality of channel condition models to the first device, to a group of one or more devices comprising the first device, to a plurality of devices within a same cell, or any combination thereof.

Aspect 21: The method of any of aspects 18 through 20, wherein transmitting the second control signaling comprises: transmitting, via the second control signaling, a set of model one or more parameters associated with the channel condition model, the set of one or more model parameters comprising a duration of the channel condition model or an amplitude of the channel condition model or both.

Aspect 22: The method of aspect 21, further comprising: transmitting, to the first device, a first control message that configures a plurality of sets of model parameters associated with a plurality of channel condition models; and transmitting, via the second control signaling, an indication of the set of one or more model parameters associated with the channel condition model from the plurality of sets of model parameters configured by the first control message.

Aspect 23: The method of any of aspects 18 through 22, further comprising: generating the plurality of values associated with the set of one or more control parameters over the time period in accordance with the channel condition model and based at least in part on a difference between a current time and a reference time associated with the channel condition model.

Aspect 24: The method of aspect 23, further comprising: transmitting, to the first device, a control message that indicates the reference time for the first device.

Aspect 25: The method of any of aspects 18 through 24, wherein transmitting the second control signaling comprises: transmitting a DCI message that indicates the one or more initial values of the set of one or more control parameters and the channel condition model for the first device; and starting a timer in response to receiving the DCI message, a duration of the timer based at least in part on the time period.

Aspect 26: The method of any of aspects 18 through 25, further comprising: transmitting, to the first device and during the time period, one or more DCI messages that indicate resource allocations for the communications between the first device and the second device, each DCI message of the one or more DCI messages comprising a resource indication field and excluding an MCS field, a TPC field, a TCI field, or any combination thereof based at least in part on the prediction capability of the first device.

Aspect 27: The method of any of aspects 18 through 26, wherein transmitting the first control signaling comprises: transmitting, via the first control signaling, an indication that the prediction capability of the first device is activated for a first HARQ process, activated for a plurality of HARQ processes, activated per SRI, or any combination thereof.

Aspect 28: The method of any of aspects 18 through 27, further comprising: receiving, from the first device, a capability message that indicates the prediction capability of the first device.

Aspect 29: The method of any of aspects 18 through 28, further comprising: receiving, from the first device, one or more measurement report messages comprising an indication of CSI associated with a channel between the first device and the second device, position information associated with the first device, or both, the channel condition model based at least in part on the one or more measurement reports.

Aspect 30: An apparatus for wireless communication at a first device, comprising a processor; and memory coupled with the processor, the processor configured to perform a method of any of aspects 1 through 17.

Aspect 31: An apparatus for wireless communication at a first device, comprising at least one means for performing a method of any of aspects 1 through 17.

Aspect 32: A non-transitory computer-readable medium storing code for wireless communication at a first device, the code comprising instructions executable by a processor to perform a method of any of aspects 1 through 17.

Aspect 33: An apparatus for wireless communication at a second device, comprising a processor; and memory coupled with the processor, the processor configured to perform a method of any of aspects 18 through 29.

Aspect 34: An apparatus for wireless communication at a second device, comprising at least one means for performing a method of any of aspects 18 through 29.

Aspect 35: A non-transitory computer-readable medium storing code for wireless communication at a second device, the code comprising instructions executable by a processor to perform a method of any of aspects 18 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
   at least one processor; and
   at least one memory coupled with the at least one processor, the at least one processor configured to:
      receive first control signaling that activates a prediction capability of the first device to generate a set of one or more control parameters for communications;
      receive second control signaling that indicates one or more initial values of the set of one or more control parameters and a channel condition model for the first device;
      generate a plurality of values associated with the set of one or more control parameters over a time period, the generated plurality of values based at least in part on the one or more initial values of the set of one or more control parameters and the channel condition model; and
      communicate with a second device during at least the time period according to the generated plurality of values associated with the set of one or more control parameters.

2. The apparatus of claim 1, wherein, to receive the first control signaling, the at least one processor is configured to:
   receive, via the first control signaling, an indication of a plurality of channel condition models comprising at least the channel condition model.

3. The apparatus of claim 2, wherein, to receive the second control signaling, the at least one processor is configured to:
   receive, via the second control signaling, an indication of an index of the channel condition model from the plurality of channel condition models.

4. The apparatus of claim 2, wherein, to receive the second control signaling, the at least one processor is configured to:
   receive a first control message that indicates a subset of indices of a subset of channel condition models from the plurality of channel condition models; and
   receive a second control message that indicates an index of the channel condition model for the first device from the subset of indices.

5. The apparatus of claim 2, wherein the first control signaling indicates a respective type or a respective set of parameters or both associated with each channel condition model of the plurality of channel condition models, the respective type corresponding to a normalized function indicative of a state of a channel between the first device and the second device, and the respective set of parameters comprising an amplitude or a duration or both of the normalized function.

6. The apparatus of claim 1, wherein, to receive the second control signaling, the at least one processor is configured to:
   receive, via the second control signaling, a set of one or more model parameters associated with the channel condition model, the set of one or more model parameters comprising a duration of the channel condition model or an amplitude of the channel condition model or both.

7. The apparatus of claim 6, wherein the at least one processor is further configured to:
   receive a first control message that configures a plurality of sets of model parameters associated with a plurality of channel condition models; and
   receive, via the second control signaling, an indication of the set of one or more model parameters associated with the channel condition model from the plurality of sets of model parameters configured by the first control message.

8. The apparatus of claim 1, wherein, to generate the plurality of values associated with the set of one or more control parameters, the at least one processor is configured to:
   generate the plurality of values associated with the set of one or more control parameters over the time period in accordance with the channel condition model and based at least in part on a difference between a current time and a reference time associated with the channel condition model.

9. The apparatus of claim 8, wherein the at least one processor is further configured to:
   receive a control message that indicates the reference time for the first device.

10. The apparatus of claim 1, wherein, to receive the second control signaling, the at least one processor is configured to:
    receive a downlink control information message that indicates the one or more initial values of the set of one or more control parameters and the channel condition model for the first device; and
    start a timer in response to receiving the downlink control information message, a duration of the timer based at least in part on the time period.

11. The apparatus of claim 1, wherein the at least one processor is further configured to:
    receive a control message that indicates the time period for the first device.

12. The apparatus of claim 1, wherein the at least one processor is further configured to:
    receive, during the time period, one or more downlink control information messages that indicate resource allocations for the communications between the first device and the second device, each downlink control information message of the one or more downlink control information messages comprising a resource indication field and excluding a modulation and coding scheme field, a transmit power control field, a transmission configuration indicator field, or any combination thereof based at least in part on the prediction capability of the first device.

13. The apparatus of claim 1, wherein, to receive the first control signaling, the at least one processor is configured to:
receive, via the first control signaling, an indication that the prediction capability of the first device is activated for a first hybrid automatic repeat request process, activated for a plurality of hybrid automatic repeat request processes, activated per sounding reference signal resource indicator, or any combination thereof.

14. The apparatus of claim 1, wherein the at least one processor is further configured to:
transmit, to the second device, a capability message that indicates the prediction capability of the first device.

15. The apparatus of claim 1, wherein the at least one processor is further configured to:
transmit, to the second device, one or more measurement report messages comprising an indication of channel state information associated with a channel between the first device and the second device or position information associated with the first device or both, the channel condition model based at least in part on the one or more measurement report messages.

16. The apparatus of claim 1, wherein the set of one or more control parameters comprises modulation and coding scheme parameters, beam parameters, uplink power control parameters, or any combination thereof.

17. The apparatus of claim 1, wherein:
the first control signaling comprises radio resource control signaling; and
the second control signaling comprises second radio resource control signaling, a medium access control-control element, downlink control information, a downlink control channel message, or any combination thereof.

18. An apparatus for wireless communication at a second device, comprising:
at least one processor; and
at least one memory coupled with the at least one processor, the at least one processor configured to:
transmit, to a first device, first control signaling that activates a prediction capability of the first device;
transmit, to the first device, second control signaling that indicates one or more initial values of a set of one or more control parameters for communications and a channel condition model for the first device;
generate a plurality of values associated with the set of one or more control parameters over a time period, the generated plurality of values based at least in part on the one or more initial values of the set of one or more control parameters and the channel condition model; and
schedule communications with the first device during at least the time period according to the generated plurality of values associated with the set of one or more control parameters.

19. The apparatus of claim 18, wherein the at least one processor is further configured to:
transmit, via the first control signaling, an indication of a plurality of channel condition models comprising at least the channel condition model; and
transmit, via the second control signaling, an indication of an index of the channel condition model from the plurality of channel condition models.

20. The apparatus of claim 19, wherein the at least one processor is further configured to:
transmit the indication of the plurality of channel condition models to the first device, to a group of one or more devices comprising the first device, to a plurality of devices within a same cell, or any combination thereof.

21. The apparatus of claim 18, wherein, to transmit the second control signaling, the at least one processor is configured to:
transmit, via the second control signaling, a set of one or more model parameters associated with the channel condition model, the set of one or more model parameters comprising a duration of the channel condition model or an amplitude of the channel condition model or both.

22. The apparatus of claim 21, wherein the at least one processor is further configured to:
transmit, to the first device, a first control message that configures a plurality of sets of model parameters associated with a plurality of channel condition models; and
transmit, via the second control signaling, an indication of the set of one or more model parameters associated with the channel condition model from the plurality of sets of model parameters configured by the first control message.

23. The apparatus of claim 18, wherein the at least one processor is further configured to:
generate the plurality of values associated with the set of one or more control parameters over the time period in accordance with the channel condition model and based at least in part on a difference between a current time and a reference time associated with the channel condition model.

24. The apparatus of claim 18, wherein, to transmit the second control signaling, the at least one processor is configured to:
transmit a downlink control information message that indicates the one or more initial values of the set of one or more control parameters and the channel condition model for the first device; and
start a timer in response to receiving the downlink control information message, a duration of the timer based at least in part on the time period.

25. The apparatus of claim 18, wherein the at least one processor is further configured to:
transmit, to the first device and during the time period, one or more downlink control information messages that indicate resource allocations for the communications between the first device and the second device, each downlink control information message of the one or more downlink control information messages comprising a resource indication field and excluding a modulation and coding scheme field, a transmit power control field, a transmission configuration indicator field, or any combination thereof based at least in part on the prediction capability of the first device.

26. The apparatus of claim 18, wherein the at least one processor is configured to:
receive, from the first device, one or more measurement report messages comprising an indication of channel state information associated with a channel between the first device and the second device or position information associated with the first device or both, the channel condition model based at least in part on the one or more measurement report messages.

27. A method for wireless communication at a first device, comprising:

receiving first control signaling that activates a prediction capability of the first device to generate a set of one or more control parameters for communications;

receiving second control signaling that indicates one or more initial values of the set of one or more control parameters and a channel condition model for the first device;

generating a plurality of values associated with the set of one or more control parameters over a time period, the generated plurality of values based at least in part on the one or more initial values of the set of one or more control parameters and the channel condition model; and communicating with a second device during at least the time period according to the generated plurality of values associated with the set of one or more control parameters.

28. The method of claim 27, wherein receiving the first control signaling comprises:

receiving, via the first control signaling, an indication of a plurality of channel condition models comprising at least the channel condition model.

29. A method for wireless communication at a second device, comprising:

transmitting, to a first device, first control signaling that activates a prediction capability of the first device;

transmitting, to the first device, second control signaling that indicates one or more initial values of a set of one or more control parameters for communications and a channel condition model for the first device;

generating a plurality of values associated with the set of one or more control parameters over a time period, the generated plurality of values based at least in part on the one or more initial values of the set of one or more control parameters and the channel condition model; and scheduling communications with the first device during at least the time period according to the generated plurality of values associated with the set of one or more control parameters.

30. The method of claim 29, further comprising:

transmitting, via the first control signaling, an indication of a plurality of channel condition models comprising at least the channel condition model; and transmitting, via the second control signaling, an indication of an index of the channel condition model from the plurality of channel condition models.

31. The method of claim 27, further comprising:

receiving, via the second control signaling, a set of one or more model parameters associated with the channel condition model, the set of one or more model parameters comprising a duration of the channel condition model or an amplitude of the channel condition model or both.

32. The method of claim 27, wherein, generating the plurality of values associated with the set of one or more control parameters comprises:

generating the plurality of values associated with the set of one or more control parameters over the time period in accordance with the channel condition model and based at least in part on a difference between a current time and a reference time associated with the channel condition model.

33. The method of claim 27, wherein receiving the second control signaling comprises:

receiving a downlink control information message that indicates the one or more initial values of the set of one or more control parameters and the channel condition model for the first device; and starting a timer in response to receiving the downlink control information message, a duration of the timer based at least in part on the time period.

34. The method of claim 29, wherein transmitting the second control signaling comprises:

transmitting, via the second control signaling, a set of one or more model parameters associated with the channel condition model, the set of one or more model parameters comprising a duration of the channel condition model or an amplitude of the channel condition model or both.

35. The method of claim 29, further comprising:

generating the plurality of values associated with the set of one or more control parameters over the time period in accordance with the channel condition model and based at least in part on a difference between a current time and a reference time associated with the channel condition model.

36. The method of claim 29, wherein transmitting the second control signaling comprises:

transmitting a downlink control information message that indicates the one or more initial values of the set of one or more control parameters and the channel condition model for the first device; and starting a timer in response to receiving the downlink control information message, a duration of the timer based at least in part on the time period.

37. A non-transitory computer-readable medium storing code for wireless communication at first device, the code comprising instructions executable by at least one processor to:

receive first control signaling that activates a prediction capability of the first device to generate a set of one or more control parameters for communications;

receive second control signaling that indicates one or more initial values of the set of one or more control parameters and a channel condition model for the first device;

generate a plurality of values associated with the set of one or more control parameters over a time period, the generated plurality of values based at least in part on the one or more initial values of the set of one or more control parameters and the channel condition model; and communicate with a second device during at least the time period according to the generated plurality of values associated with the set of one or more control parameters.

38. The non-transitory computer-readable medium of claim 37, wherein the instructions to receive the first control signaling are executable by the at least one processor to:

receive, via the first control signaling, an indication of a plurality of channel condition models comprising at least the channel condition model.

39. A non-transitory computer-readable medium storing code for wireless communication at second device, the code comprising instructions executable by at least one processor to:

transmit, to a first device, first control signaling that activates a prediction capability of the first device;

transmit, to the first device, second control signaling that indicates one or more initial values of a set of one or more control parameters for communications and a channel condition model for the first device;

generate a plurality of values associated with the set of one or more control parameters over a time period, the generated plurality of values based at least in part on the one or more initial values of the set of one or more control parameters and the channel condition model; and schedule communications with the first device during at least the time period according to the generated plurality of values associated with the set of one or more control parameters.

40. The non-transitory computer-readable medium of claim 39, wherein the instructions are further executable by the at least one processor to:

transmit, via the first control signaling, an indication of a plurality of channel condition models comprising at least the channel condition model; and transmit, via the second control signaling, an indication of an index of the channel condition model from the plurality of channel condition models.

\* \* \* \* \*